US012362561B1

(12) United States Patent
Singh et al.

(10) Patent No.: US 12,362,561 B1
(45) Date of Patent: Jul. 15, 2025

(54) SYSTEMS AND METHODS FOR CAUSING SWITCHOVERS IN ELECTRICAL NETWORKS BASED ON SYSTEM AVERAGE INTERRUPTION DURATION INDEX (SAIDI) VALUES

(71) Applicant: EYGS LLP, London (GB)

(72) Inventors: Nishant Singh, Benares (IN); Rohit Monga, Gurugram (IN); Shubham Khanna, Noida (IN); Karan Batra, Chandigarh (IN)

(*) Notice: Subject to any disclaimer, the term of this patent is extended or adjusted under 35 U.S.C. 154(b) by 0 days.

(21) Appl. No.: 18/896,290

(22) Filed: Sep. 25, 2024

(51) Int. Cl.
*H02J 3/00* (2006.01)

(52) U.S. Cl.
CPC .............. *H02J 3/003* (2020.01); *H02J 3/001* (2020.01); *H02J 2203/10* (2020.01); *H02J 2203/20* (2020.01)

(58) Field of Classification Search
CPC ........ H02J 3/003; H02J 3/001; H02J 2203/20; H02J 2203/10
See application file for complete search history.

(56) References Cited

U.S. PATENT DOCUMENTS

| | | | |
|---|---|---|---|
| 6,061,609 A | 5/2000 | Kanoi et al. | |
| 8,880,234 B2 * | 11/2014 | Sekoguchi | H02J 3/38 700/286 |
| 10,585,445 B2 | 3/2020 | Wong et al. | |
| 11,017,485 B2 | 5/2021 | Riland et al. | |
| 11,157,031 B2 | 10/2021 | Wong et al. | |
| 11,747,849 B2 | 9/2023 | Forbes, Jr. | |
| 2009/0228154 A1 | 9/2009 | Trias | |
| 2012/0249092 A1 | 10/2012 | Krok et al. | |
| 2013/0204554 A1 | 8/2013 | Tuckey et al. | |
| 2020/0293033 A1 | 9/2020 | He et al. | |
| 2022/0083037 A1 | 3/2022 | Berry et al. | |

OTHER PUBLICATIONS

Teixeira, J., "IEEE 1366- Reliability Indices," IEEE Boston Section, Feb. 19, 2019, 90 pages.
Karlsson, A., "Guidelines to Implement Monitoring and Remote Control System in an Urban Distribution Grid," KTH Royal Institute of Technology School of Electrical Engineering and Computer Science, Degree Project in Electrical Engineering, Second Cycle, 30 Credits, Stockholm, Sweden, 2020. Retrieved from https://www.diva-portal.org/smash/get/diva2:1521990/FULLTEXT01.pdf, [retrieved on Jan. 27, 2025]; 85 pages.

* cited by examiner

*Primary Examiner* — Carlos Amaya
(74) *Attorney, Agent, or Firm* — COOLEY LLP

(57) ABSTRACT

A non-transitory, machine-readable medium stores instructions that, when executed by a processor, cause the processor to receive historical average system interruption duration index (ASIDI) data and calculate (1) an average of a plurality of logarithm values based on a portion of the ASIDI data that is associated with a plurality of interruption days, (2) a standard deviation of the plurality of logarithm values, and (3) an event threshold day (ETD) threshold based on the average of the plurality of logarithm values and the standard deviation of the plurality of logarithm values. An impacted electrical grid portion within an electrical grid is identified based on the ETD threshold and current ASIDI data. Switchover of the impacted electrical grid portion to a feeder from a plurality of feeders is caused based on a criticality value associated with a system that is fed by the feeder.

20 Claims, 12 Drawing Sheets

1100

```
Receive historical average system interruption duration index (ASIDI) data
1102
```

↓

```
Calculate (1) an average of a plurality of natural logarithm values based on
a portion of the ASIDI data that is associated with a plurality of interruption
days, (2) a standard deviation of the plurality of natural logarithm values,
and (3) an event threshold day (ETD) threshold based on the average of the
plurality of natural logarithm values and the standard deviation of the
plurality of natural logarithm values
1104
```

↓

```
Identify an impacted electrical grid portion within an electrical grid based
on the ETD threshold and current ASIDI data
1106
```

↓

```
Cause switchover of the impacted electrical grid portion to a feeder from a
plurality of feeders based on a criticality value associated with a system
that is fed by the feeder, the criticality value being no lower than a
criticality value of each remaining feeder from the plurality of feeders
1108
```

FIG. 11

SYSTEMS AND METHODS FOR CAUSING SWITCHOVERS IN ELECTRICAL NETWORKS BASED ON SYSTEM AVERAGE INTERRUPTION DURATION INDEX (SAIDI) VALUES

FIELD

One or more embodiments described herein relate to systems and computerized methods for identifying impacted electrical network portions based on event threshold day (ETD) thresholds and causing switchovers of the impacted electrical network portions to feeders.

BACKGROUND

In some instances, electrical networks (e.g., electrical grids) can be prone to failures and outages. An outage can impose both an initial economic cost at the onset of the outage and accumulated economic costs during the outage. A need exists, therefore, for systems and computerized methods to cause switchovers of impacted electrical network portions to feeders.

SUMMARY

According to an embodiment, a method includes receiving a plurality of daily values of an average system interruption duration index (ASIDI). The method also includes calculating (1) a logarithm of each daily value from the plurality of daily values of the ASIDI to produce a plurality of logarithm values, (2) an average of the plurality of logarithm values, (3) a standard deviation of the plurality of logarithm values, and (4) an event threshold day (ETD) threshold based on the average of the plurality of logarithm values and the standard deviation of the plurality of logarithm values. A plurality of daily values of a system average interruption duration index (SAIDI) are received, and a major event day (MED) threshold is calculated based on the plurality of daily values of the SAIDI. The method also includes identifying an impacted electrical grid portion within an electrical grid based on the ETD threshold and the MED threshold. For each feeder from a plurality of feeders within the electrical grid, a feeder reliability index (FRI) value is calculated based on the plurality of daily values of the SAIDI for that feeder and the plurality of daily values of the SAIDI for each remaining feeder from the plurality of feeders. The method also includes causing switchover of the impacted electrical grid portion to a feeder from the plurality of feeders based on (1) the FRI value of the feeder being no lower than the FRI value of each remaining feeder from the plurality of feeders and (2) an operational criticality value associated with a system that is fed by the feeder, the operational criticality value being no lower than an operational criticality value of each remaining feeder from the plurality of feeders.

According to an embodiment, a non-transitory, machine-readable medium stores instructions that, when executed by a processor, cause the processor to receive historical average system interruption duration index (ASIDI) data and historical system average interruption duration index (SAIDI) data. The instructions also cause the processor to determine (1) an event threshold day (ETD) threshold based on the historical ASIDI data and (2) a major event day (MED) threshold based on the historical SAIDI data. Current ASIDI data and current SAIDI data are received, and an impacted electrical grid portion within an electrical grid is identified based on at least one of (1) a comparison between the ETD threshold and the current ASIDI data or (2) a comparison between the MED threshold and the current SAIDI data. For each feeder from a plurality of feeders within the electrical grid, a feeder reliability index (FRI) value is determined based on a portion of the current SAIDI data that is associated with that feeder. The instructions also cause the processor to cause switchover of the impacted electrical grid portion to a feeder from the plurality of feeders based on (1) the FRI value of the feeder being no lower than the FRI value of each remaining feeder from the plurality of feeders and (2) an operational criticality value of the feeder being no lower than an operational criticality value of each remaining feeder from the plurality of feeders.

According to an embodiment, a non-transitory, machine-readable medium stores instructions that, when executed by a processor, cause the processor to receive historical average system interruption duration index (ASIDI) data and calculate (1) an average of a plurality of natural logarithm values based on a portion of the ASIDI data that is associated with a plurality of interruption days, (2) a standard deviation of the plurality of natural logarithm values, and (3) an event threshold day (ETD) threshold based on the average of the plurality of natural logarithm values and the standard deviation of the plurality of natural logarithm values. An impacted electrical grid portion within an electrical grid is identified based on the ETD threshold and current ASIDI data. Switchover of the impacted electrical grid portion to a feeder from a plurality of feeders is caused based on a criticality value associated with a system that is fed by the feeder, the criticality value being no lower than a criticality value of each remaining feeder from the plurality of feeders.

BRIEF DESCRIPTION OF THE DRAWINGS

FIG. 11 shows a flow diagram illustrating a method implemented by a grid remediation system to cause switchover of an impacted electrical grid portion to a feeder from a plurality of feeders based on a criticality value, according to an embodiment.

DETAILED DESCRIPTION

A feeder can include an electrical transmission path (e.g., a power line(s), substation(s), etc.) of electricity from (and including) a power source (e.g., a generating station) and/or a substation to a distribution point (e.g., a service area, an electrical consumer, a load, etc.). Some electrical grids (e.g., such as the electrical grid 1200 of FIG. 12, described herein) can include a plurality of feeders that can be alternatively or concurrently coupled to a consumer via at least one switch. Some known systems can actuate a switch to cause a switchover from a first feeder to a second feeder in response to a weather forecast suggesting that the first feeder could be impacted by weather. These known systems, however, do not typically leverage operational technology (OT) to predict a power utility failure and associated impacts. These known systems moreover do not typically account for operational criticality, grid balancing, or feeder reliability when determining a switchover from a potentially impacted feeder to an alternative feeder. At least some systems and methods described herein can use historical Advanced Distribution Management System (ADMS) data, historical Outage Management System (OMS) data, and/or the like, to determine performance of a feeder (e.g., performance of components within a transmission path from (and including) a power source to a consumer) relative to remaining feeders within an electrical grid that can deliver power to a consumer. Alternatively or in addition, at least some systems and methods described herein can use real-time data to cause a switchover within an electrical grid from a potentially impacted and/or less reliable power source (e.g., feeder) to a more reliable power source.

Figure 1:
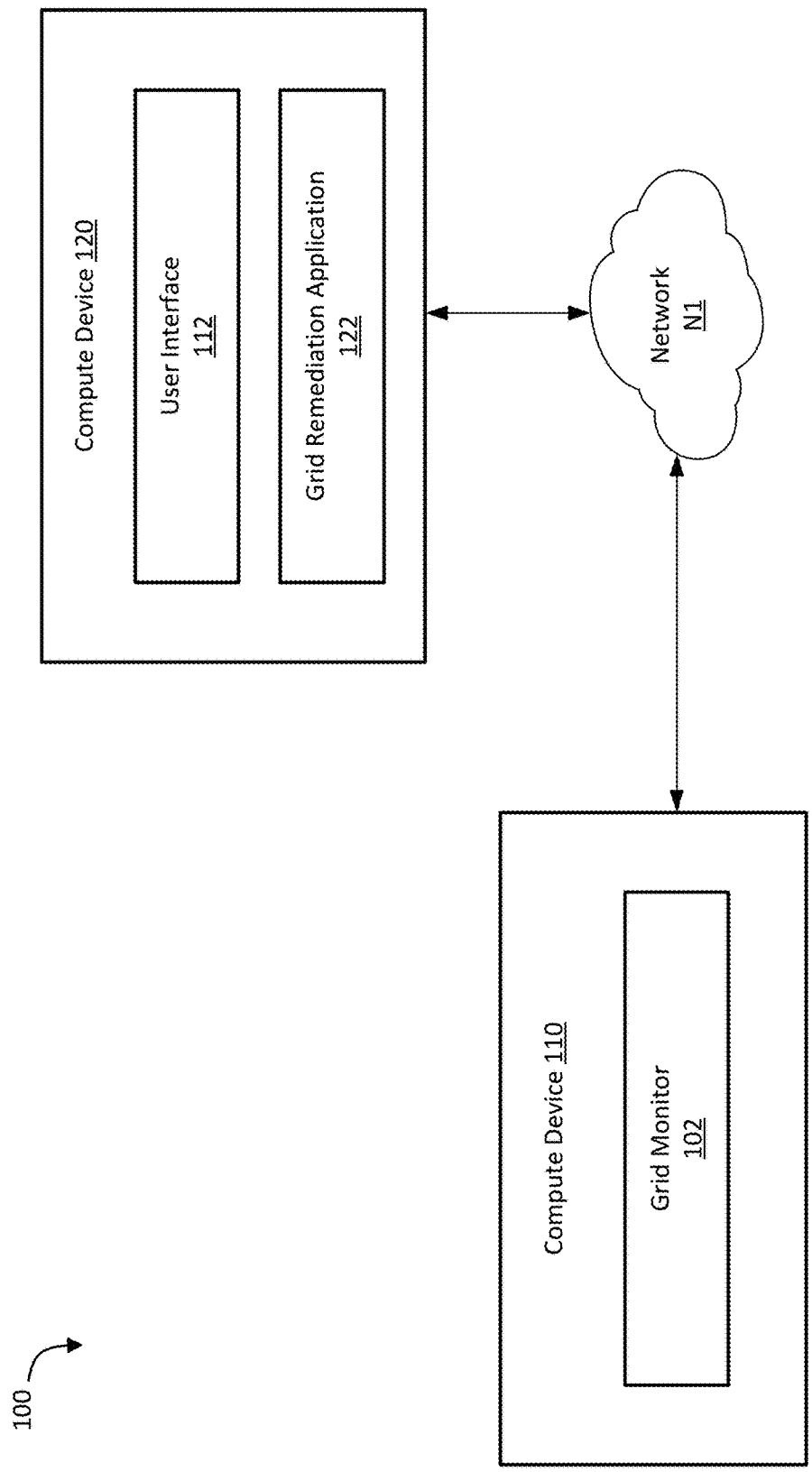
FIG. 1 shows a system block diagram of a grid remediation system, according to an embodiment.

FIG. 1 shows a system block diagram of a grid remediation system 100, according to an embodiment. The grid remediation system 100 includes a compute device 110, a compute device 120, and a network N1. The grid remediation system 100 can include alternative configurations, and various steps and/or functions of the processes described below can be shared among the various devices of the grid remediation system 100 or can be assigned to specific devices (e.g., the compute device 110, the compute device 120, and/or the like). For example, in some configurations, a user can provide inputs directly to the compute device 120 rather than via the compute device 110, as described herein.

In some embodiments, the compute device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge (e.g., with respect to the network N1 and/or an electrical grid) node or other remote (e.g., with respect to the network N1 and/or an electrical grid) computing facility and/or device. In some implementations, each of the compute device 110 and/or compute device 120 can be or included in a data center or other control facility and/or device configured to run and/or execute a distributed computing system, and can communicate with other compute devices.

The compute device 110 can include a grid monitor 102, which can include software (1) stored at a memory that functionally and/or structurally similar to the memory 210 of FIG. 2 discussed below and (2) executed via a processor that is functionally and/or structurally similar to the processor 220 of FIG. 2 discussed below. The grid monitor 102 can receive and record measurements from sensors (e.g., voltage sensors, current sensors, sensors associated with Internet of Things (IoT) devices, etc.), weather stations, etc., that are associated with an electrical grid (not shown in FIG. 1). The grid monitor 102 can further be configured to cause signals to be sent to actuators (now shown in FIG. 1), such as feeder switches (e.g., multi-pole switches, contactors, etc.), that are associated with the electrical grid. The grid monitor 102 can include or be associated with, for example, one or more of advanced distribution management system (ADMS) software; outage management system (OMS) software; weather and/or power forecasting software; head-end system (HES) software; meter data management system (MDMS) software; distributed energy resource management system (DERMS) software; fault location, isolation and service restoration (FLISR) software; automatic power restoration system (APRS) software; etc.

Figure 2:
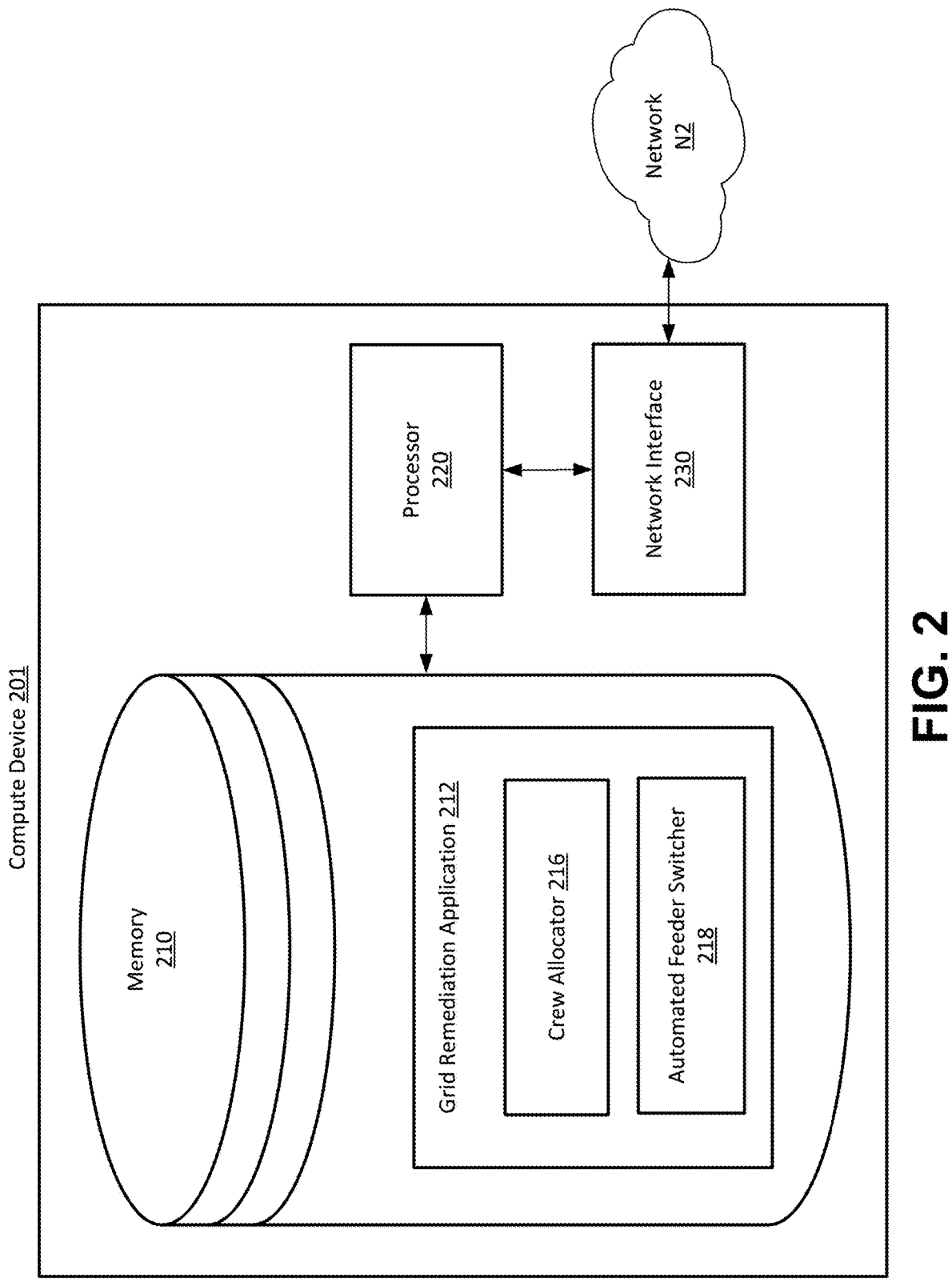
FIG. 2 shows a system block diagram of a compute device included in a grid remediation system, according to an embodiment.

The compute device 120 can implement a user interface 112 and a grid remediation application 122 (e.g., that is functionally and/or structurally equivalent to the grid remediation application 212 of FIG. 2 (described herein)). The user interface 112 can be a graphical user interface (GUI), and the compute device 120 can be configured to (1) receive input data (e.g., operational criticality values, described herein) from the user via the user interface 112 and/or (2) cause display, via the user interface 112, of output data (e.g., an indication of an impacted electrical grid portion, described further herein) generated by the grid remediation application 122. The grid remediation application 122 can be implemented via software and/or hardware. As described herein, the grid remediation application 122 can identify an impacted electrical grid portion (e.g., impacted (or potentially impacted) consumers) and, in response, cause a switchover from a first feeder to a second feeder to change the transmission path of electrical power to the impacted electrical grid portion. As described further herein, the grid remediation application 122 can also monitor grid frequency and, in response to detecting an anomalous grid frequency, can cause load on the electrical grid to increase and/or decrease to cause a change in the grid frequency.

The compute device 110 can be networked and/or communicatively coupled to the compute device 120, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the grid remediation system 100 can include multiple compute devices 110 and/or compute devices 120. For example, in some implementations, the grid remediation system 100 can include a plurality of compute devices 110, where each compute device 110 can be associated with a different user from a plurality of users. In some implementations, a plurality of compute devices 110 can be associated with a single user, where each compute device 110 can be associated with, for example, a different input modality (e.g., text input, audio input, video input, etc.).

FIG. 2 shows a system block diagram of a compute device included in a grid remediation system, according to an embodiment. The compute device 201 can be structurally and/or functionally similar to, for example, the compute device 120 of the grid remediation system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus). In some implementations, as described further herein, the processor 220 can include a plurality of processors arranged in parallel and/or an aggregation processor.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a grid remediation application 212. The grid remediation application 212 can be functionally and/or structurally similar to the grid remediation application 122 of FIG. 1 and/or the grid remediation application 312 of FIG. 3 (described further herein).

Figure 3:
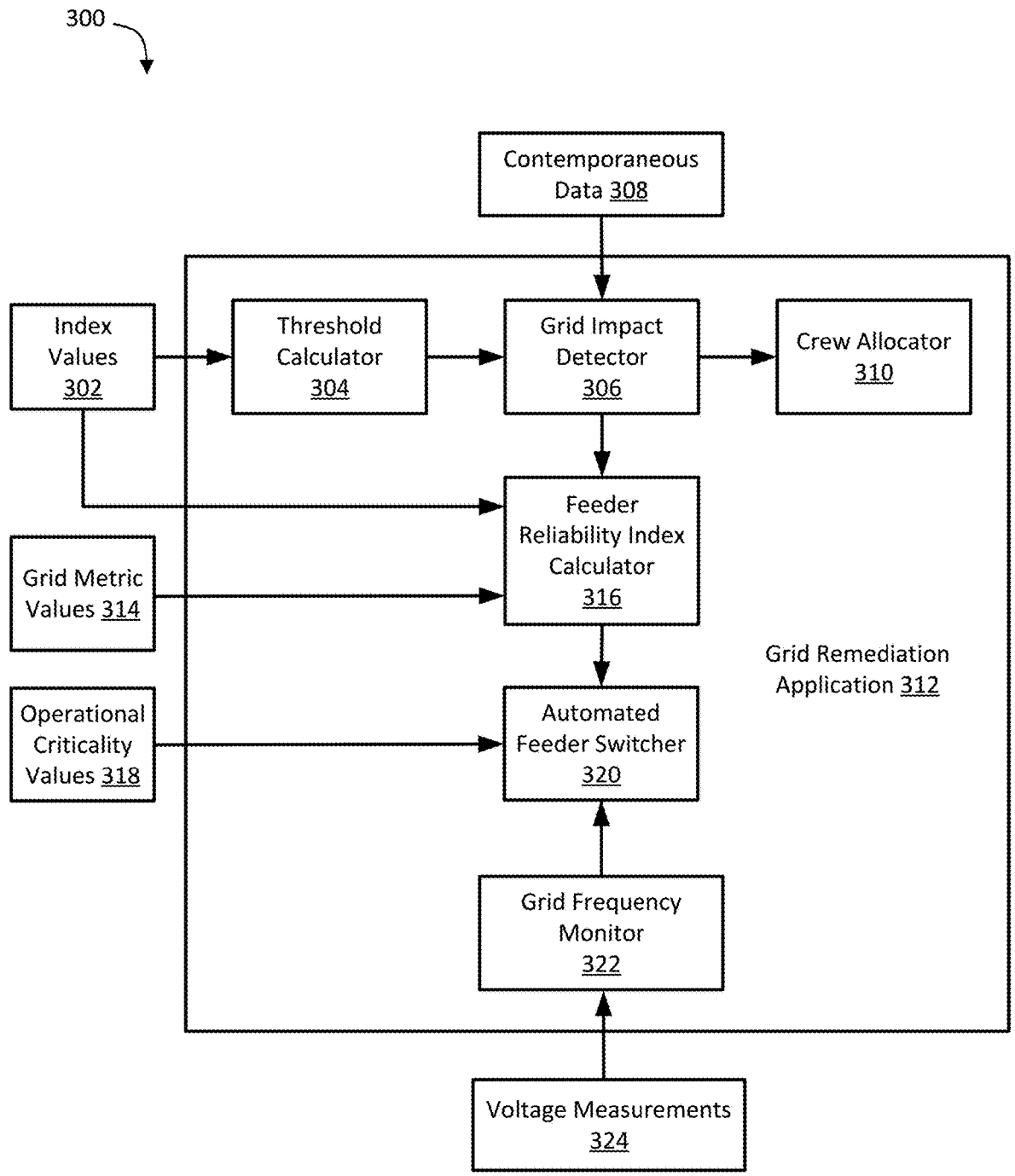
FIG. 3 shows a system block diagram of grid remediation components included in a grid remediation system, according to an embodiment.

The grid remediation application 212 includes a crew allocator 216, which can be functionally and/or structurally similar to the crew allocator 310 of FIG. 3, described further herein. The grid remediation application 212 can also include an automated feeder switcher 218, which can be functionally and/or structurally similar to the automated feeder switcher 320 of FIG. 3, described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be any display device (e.g., a monitor, screen, etc.) by which the compute device 201 can output and/or display data (e.g., via a user interface that is structurally and/or functionally similar to the user interface 112 of FIG. 1). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals.

FIG. 3 shows a system block diagram of grid remediation components 300 included in a grid remediation system, according to an embodiment. The grid remediation components 300 can be associated with a compute device (e.g., a compute device that is structurally and/or functionally similar to the compute device 201 of FIG. 2 and/or the compute devices 110 and 120 of FIG. 1). In some instances, for example, the grid remediation components 300 can be included in and/or associated with (1) the grid remediation application 122 of FIG. 1 and/or (2) the grid remediation application 212 of FIG. 2. In some instances, the grid remediation components 300 can include software stored in memory 210 and configured to execute via the processor 220 of FIG. 2. In some instances, for example, at least a portion of the grid remediation components 300 can be implemented in hardware (e.g., an ASIC). The grid remediation components 300 receive as input index values 302, contemporaneous data 308, grid metric values 314, operational criticality values 318, and a plurality of voltage measurements 324. The grid remediation components 300 include a grid remediation application 312 (e.g., that is functionally and/or structurally similar to the grid remediation application 122 of FIG. 1 and/or the grid remediation application 212 of FIG. 2), and the grid remediation application 312 includes a threshold calculator 304, a grid impact detector 306, a crew allocator 310, a feed reliability index (FRI) calculator 316, an automated feeder switcher 320, and a grid frequency monitor 322.

Figure 12:
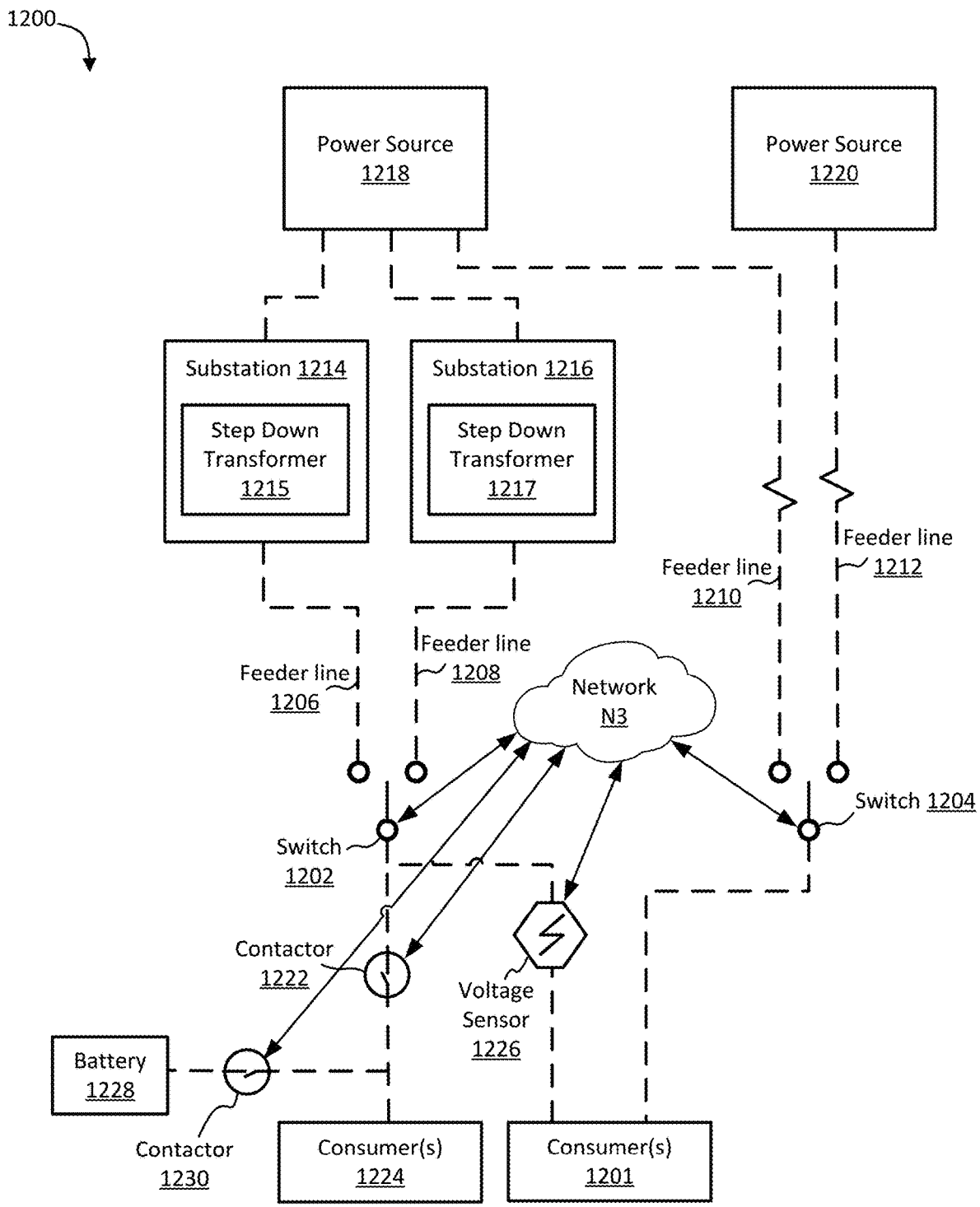
FIG. 12 shows a schematic diagram of an electrical grid, according to an embodiment.

The index values 302 can be associated with at least one reliability index that is associated with electric power utilities (e.g., an electrical grid that is structurally and/or functionally similar to the electrical grid 1200 of FIG. 12, described herein). For example, in some implementations, the index values 302 can be associated with a system average interruption duration index (SAIDI) and/or an average system interruption duration index (ASIDI). SAIDI can be a measure of an average duration of a power outage (e.g., a supply interruption, a power reduction below a predetermined threshold, etc.) per served customer (e.g., power consumer) per year (or per some other time duration), and ASIDI can be a measure of an average duration of a power outage per served energy (e.g., per load) per year (or per some other time duration). The index values 302 can include, for example, a daily ASIDI value (e.g., one ASIDI value per day) and/or a daily SAIDI value (e.g., one SAIDI value per day), that can be received daily (e.g., once per 24-hour period) from a grid monitor (e.g., that is functionally and/or structurally similar to the grid monitor 102 of FIG. 1). In some instances, to calculate a daily SAIDI value and/or a daily ASIDI value, an interruption duration that extends into a subsequent day(s) can accrue (e.g., be attributed, be assigned, etc.) to the day on which the interruption begins. In some instances, the index values 302 can be historical index values (e.g., that are associated with past days and not current days) that are different from contemporaneous index values included in the contemporaneous data 308, described further herein.

The threshold calculator 304 can be configured to determine, based on the index values 302, a major event day (MED) threshold $T_{MED}$ and/or an event threshold day (ETD) threshold $L_{ETD}$. A Major Event Day (MED) can be a day in which an associated daily SAIDI value exceeds the threshold value $T_{MED}$. The threshold calculator 304 can calculate a $T_{MED}$ value at the end of a reporting period (e.g., at the end of a one-year period) for use during a next reporting period. To calculate a $T_{MED}$ value, the threshold calculator 304 can receive index values 302 that include daily SAIDI values for, e.g., five sequential years, ending on the last day of the last complete reporting period. If fewer than five years (or some other predetermined duration) of historical data are available, the threshold calculator 304 can use any available historical data. In some instances, the threshold calculator 304 can use only days that have a non-zero and/or non-null SAIDI/day value to calculate $T_{MED}$. Similarly stated, the threshold calculator 304 can filter out days that did not have any interruptions as indicated by the SAIDI value.

The threshold calculator 304 can calculate a logarithm (e.g., a natural logarithm (ln)) of each daily SAIDI value for the five-year (or other) duration. Then, the threshold calculator 304 can calculate the average (referred to herein as a (alpha)) and the standard deviation (referred to herein as B (Beta)) of these logarithms. The threshold calculator 304 can calculate $T_{MED}$ according to the equation below:

$$T_{MED}=e^{(\alpha+2.5\beta)}$$

A day that occurs during the subsequent reporting period and has a daily SAIDI greater than the threshold value $T_{MED}$ can be classified as a MED, which can indicate that a threshold number of customers experienced a power outage for that day. The threshold calculator 304 can calculate a threshold value $L_{ETD}$ similar to $T_{MED}$, except the threshold calculator 304 can use ASIDI values instead of SAIDI values, as described further at least in relation to FIG. 4. A day that occurs during the subsequent reporting period and has a daily ASIDI greater than the threshold value $L_{ETD}$ can be classified as an event threshold day (ETD). In some instances, an operator of an electrical grid (e.g., a utility company) can categorize customers as industrial, commercial, residential, etc. For the purpose of illustration, industrial and commercial customers can for example account for 10% of the total number of customers associated with an electrical grid while consuming 60% of the power produced by the electrical grid. The grid remediation application 312 can use load-based threshold values $L_{ETD}$ to prioritize power delivery that maximizes load rather than (or in addition to) maximizes the number of customers served.

The index values 302 can be associated with a given portion of an electrical grid, such as a phase line(s) between an electricity generating site and an electrical substation that serves a plurality of customers, a distribution segment between a transformer and an industrial and/or commercial customer(s), a segment within a city network or a rural network, etc. As a result, the threshold calculator 304 can, in at least some instances, calculate a plurality of $T_{MED}$ and/or $L_{ETD}$ values that are associated with different portions of the grid. As described further below, the grid impact detector 306 can compare contemporaneous index values for a given portion of the grid to a threshold value for that portion to identify an impacted electrical grid portion.

The grid impact detector 306 can be configured to receive contemporaneous data 308 and the threshold values that are calculated by the threshold calculator 304 to identify an impacted electrical grid portion within the electrical grid. The contemporaneous data 308 can include, for example, a contemporaneous daily ASIDI value (e.g., an ASIDI value that is calculated for a day during which the grid impact detector 306 is executing) and/or a contemporaneous daily SAIDI value. The grid impact detector 306 can compare a contemporaneous daily ASIDI value and/or a contemporaneous daily SAIDI value to, respectively, the threshold values $T_{MED}$ and $L_{ETD}$ generated by the threshold calculator 304. Based on a comparison(s), the grid impact detector 306 can identify an impacted electrical grid portion that has failed (e.g., resulting in an outage) and/or that is susceptible to failing in the future. An electrical grid portion can include, for example, a high voltage (e.g., 110 kV, 265-275 kV, and/or the like) transmission line (e.g., a phase wire(s) coupled to a power generation facility), a distribution grid having one or more low voltage (e.g., 50 kV) distribution lines, a network coupled to a substation, etc.

The grid impact detector 306 can implement, for example, the following comparisons to identify an impacted electrical grid portion:

Lightly impacted if (($T_{MED}$>SAIDI>0.5 $T_{MED}$) OR ($L_{ETD}$>ASIDI>0.5 $L_{ETD}$))

Moderately impacted if (($2T_{MED}$>SAIDI>$T_{MED}$) OR ($2L_{ETD}$>ASIDI>$L_{ETD}$))

Heavily impacted if =(($3T_{MED}$)>SAIDI) OR ($3L_{ETD}$>ASIDI))

In some implementations, the contemporaneous data 308 can include an indication of a human factor. A human factor can include, for example, a strike and/or lockdown at a power generation facility that can affect power availability at a feeder; a festival, holiday, and/or the like, that can cause an increase or decrease in power demand; etc. Alternatively or in addition, the contemporaneous data 308 can also include weather data, such as temperature data, precipitation data, an indication of a severe weather event, etc., which can be associated with a geographic location of the electrical grid and can indicate an expected increase or decrease in power demand. The grid impact detector 306 can include, for example, a machine learning model (e.g., a feedforward neural network, a recurrent neural network, and/or the like) that can receive the indication of the human factor and/or the weather data as input to predict a portion of the electrical grid that is unlikely to meet customer demand. More specifically, the machine learning model can predict whether the portion of the electrical grid is likely to fail and produce and/or transmit no power, likely to produce and/or transmit reduced power than what is typical for that portion of the electrical grid, or likely to lack the capacity to increase power production and/or transmission to meet increased demand. In some instances, the weather data can include time series data that spans a plurality of days. For example, the weather data can indicate a stretch of hot weather, which can more severely impact the electrical grid the more prolonged the hot weather is as a result of increase power demand, equipment failure, and/or the like. Similarly, a stretch of cold weather can increasingly impact power production and/or transmission the more prolonged the cold weather is. The machine learning model can be configured to account for the length of a weather condition (e.g., by including a recurrent neural network (RNN) layer that is configured to analyze time series data) while predicting impact to the electrical grid.

In some implementations, the grid impact detector 306 can cause a representation of an impacted electrical grid portion to be displayed (e.g., via a user interface that is functionally and/or structurally similar to the user interface 112 of FIG. 1). For example, a user interface can display a representation of the electrical grid, and the grid impact detector 306 can cause an indication of an impacted portion of the electrical grid to be superimposed over the displayed representation of the electrical grid (e.g., by highlighting the associated portion of the representation of the electrical grid with yellow if the portion is lightly impacted, orange if the portion is moderately impacted, and/or red if the portion is heavily impacted).

The grid remediation application 312 can facilitate at least one response to an impacted electrical grid portion that is identified via the grid impact detector 306. For example, the crew allocator 310 can identify a crew (e.g., that includes one or more repair technicians, linemen, etc.) from a plurality of crews that is suitably equipped, geographically positioned, and/or experienced to address the impacted electrical grid portion in a timely manner. To identify a crew, the crew allocator 310 can for example implement the method described herein at least in relation to FIG. 8. Alternatively or in addition, the grid remediation application 312 can identify an alternative feeder via the feeder reliability index (FRI) calculator 316 and can further cause (e.g., automatically, without human intervention) switchover of the impacted electrical grid portion to the alternative feeder to improve electrical power delivery and/or reduce the likelihood of a power outage for a customer(s). The alternative feeder can be from a plurality of feeders, and each feeder from the plurality of feeders can be associated with (1) a power generation source that is different than remaining power generation sources from a plurality of power generation sources, (2) a transformer that is different than remaining transformers from a plurality of transformers, and/or (3) a transmission line that is different than remaining transmission lines from a plurality of transmission lines.

The FRI calculator 316 can receive grid metric values 314 for a plurality of feeders that is associated with the electrical grid, and for a given feeder, can calculate an FRI value based on a grid metric value(s) for that feeder and a SAIDI value for that feeder. More specifically, the FRI calculator 316 can calculate the FRI value for a given feeder by implementing the method described herein at least in relation to FIG. 6. The grid metric values 314 can include for example, an underground length value (e.g., a percentage of feeder-associated equipment, transmission lines, etc., that are underground, and/or a percentage of a total length of a feeder network that is underground), a load margin availability value (e.g., an indication of power demand on a feeder as a percentage of a maximum capacity (e.g., a power rating) for that feeder), and/or an indication of whether the feeder can be automatically (e.g., without human intervention) and/or remotely switched (e.g., via a controlled actuator).

In some instances, a feeder can feed electricity to critical consumers that are associated with, for example, healthcare (e.g., hospitals, clinics, etc.), utilities (e.g., water pump stations), transportations (e.g., airports, railways, roadways, etc.), communications (e.g., cellular towers), public institutions (e.g., police stations, fire stations, etc.), and/or the like. An operational criticality value 318 for a feeder can be defined (e.g., by a user via an interface that is functionally and/or structurally similar to the user interface 112 of FIG. 1) based on a percentage of the feeder's total load that is attributable to critical consumers. In some instances, an operational criticality value 318 for each feeder can be determined for a given day, such as a day on which load on the electrical grid was highest (e.g., a peak day). The automated feeder switcher 320 can then use operational criticality value 318 determined for the peak day to prioritize feeder switching on subsequent days, as described further below.

A feeder can be considered a critical feeder if its operational criticality value 318 is above a predetermined threshold (e.g., above 50%, above 60%, etc.). If an impacted electrical grid portion identified by the grid impact detector 306 is associated with a plurality of impacted feeders, and the automated feeder switcher 320 determines that at least one of these impacted feeders is a critical feeder based on the operational criticality values 318, the automated feeder switcher 320 can cause a switchover of the at least one impacted feeder to an alternative feeder(s) before causing switchover of any remaining, non-critical feeders to an alternative feeder(s).

In some instances, a line frequency (e.g., a nominal frequency of alternating current transmitted via the electrical grid, such as a nominal 50 Hz frequency, a nominal 60 Hz frequency, etc.) can vary based on, for example, excess load (which can withdraw rotational energy from a generator shaft and reduce the frequency of the generated current) and/or excess force at the generator shaft (e.g., as a result of reduced load) can increase rotational energy and, therefore, frequency. In some instances, a switchover of an impacted electrical grid portion to an alternative feeder can cause a change in grid frequency within the impacted electrical grid portion as a result of, for example, a change in power source, a change in grid impedance (e.g., as a result of a change in line length, online equipment, etc.), a change in load, etc. The grid frequency monitor 322 can be configured to detect a change in grid frequency beyond a predetermined threshold. For example, the grid frequency monitor 322 can detect (e.g., based on the plurality of voltage measurements 324) that the grid frequency is below a predetermined minimum threshold and, in response, can cause a non-essential feeder(s) to be decoupled from the electrical grid. By decoupling the non-essential feeder(s) (e.g., transmission path(s) to a non-essential consumer(s)), load that is attributable to a non-essential consumer(s) that receives power via the non-essential feeder(s) is reduced, and the grid frequency can increase as a result. The grid frequency monitor 322 can also detect that the grid frequency is above a predetermined maximum threshold and, in response, can cause a battery, capacitor, distributed energy resource (DER), and/or other energy storage system to be coupled to the electrical grid, such that power can be drawn from the electrical grid to charge the battery, capacitor, DER, etc. This increase in load can cause the grid frequency to decrease to below the predetermined maximum threshold.

Figure 4:
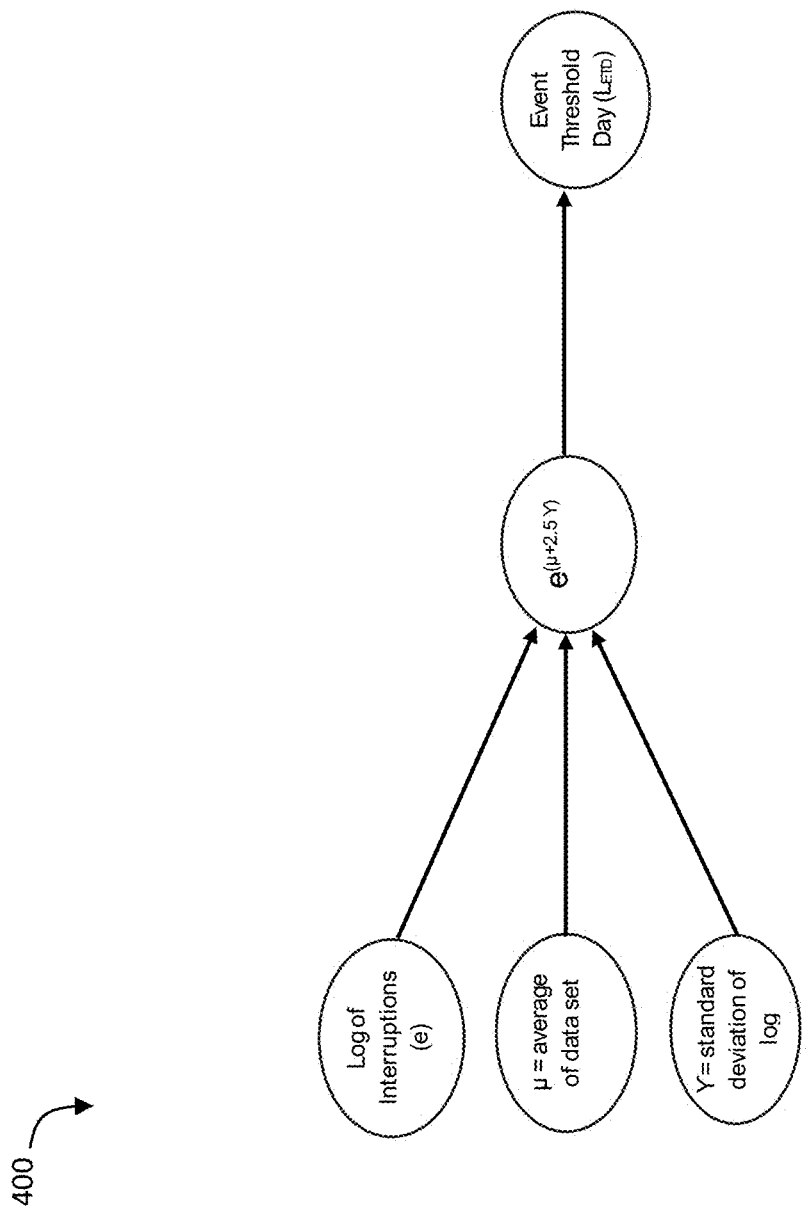
FIG. 4 shows a flow diagram illustrating a method implemented by a grid remediation system to determine an event threshold day (ETD) threshold, according to an embodiment.

FIG. 4 shows a flow diagram illustrating a method 400 implemented by a grid remediation system to determine an event threshold day (ETD) threshold $L_{ETD}$, according to an embodiment. The method 400 can be implemented by a grid remediation system described herein (e.g., the grid remediation system 100 of FIG. 1). For example, the method 400 can be performed by a threshold calculator that is functionally and/or structurally similar to the threshold calculator 304 of FIG. 3. Portions of the method 400 can be implemented using a processor (e.g., the processor 220 of FIG. 2) of any suitable compute device (e.g., the compute device 201 of FIG. 2 and/or the compute devices 110 and/or 120 of FIG. 1).

The method 400 includes collecting values of daily ASIDI values for five sequential years, ending on the last day of the last complete reporting period. If fewer than five years of historical data are available, any available historical ASIDI values can be used. Days that have an ASIDI/Day value can be used to calculate $L_{ETD}$, and days that did not have any interruptions can be excluded from the calculation. A natural logarithm (In) is determined for each daily ASIDI value, and the average u of these logarithms is then determined. The standard deviation $\gamma$ of the logarithms is determined, and $L_{ETD}$ is calculated based on the equation $L_{ETD} = e^{(\mu + 2.5\gamma)}$.

Figure 5:
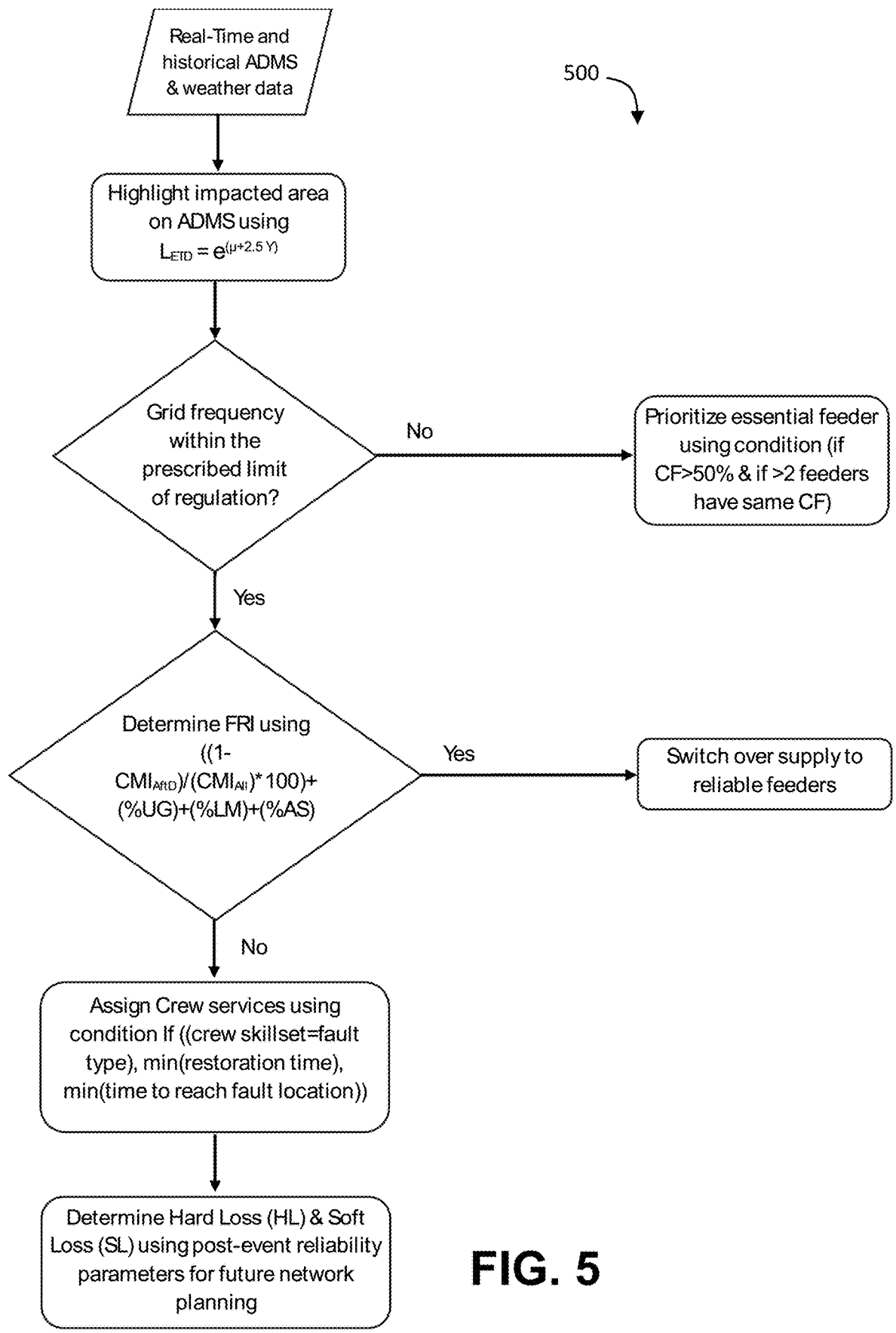
FIG. 5 shows a flow diagram illustrating a method implemented by a grid remediation system to cause switchover to a feeder and/or assign a crew to an impacted portion of an electrical grid, according to an embodiment.

FIG. 5 shows a flow diagram illustrating a method 500 implemented by a grid remediation system to cause switchover to a feeder and/or assign a crew to an impacted portion of an electrical grid, according to an embodiment. The method 500 can be implemented by a grid remediation system described herein (e.g., the grid remediation system 100 of FIG. 1). Portions of the method 500 can be implemented using a processor (e.g., the processor 220 of FIG. 2) of any suitable compute device (e.g., the compute device 201 of FIG. 2 and/or the compute devices 110 and/or 120 of FIG. 1).

The method 500 includes receiving read-time historical ADMS and weather date. The method 500 also includes determining $L_{ETD}$ (e.g., via a threshold calculator that is functionally and/or structurally similar to the threshold calculator 304 of FIG. 3) to identify an impacted electrical grid portion(s). The method 500 also includes monitoring grid frequency (e.g., via a grid frequency monitor that is functionally and/or structurally similar to the grid frequency monitor 322 of FIG. 3) and, in response to detecting a grid frequency that is lower than a predetermined threshold (also referred to as a prescribed limit of regulation), causing a non-critical feeder(s) (e.g., as determined by an automated feeder switcher that is functionally and/or structurally similar to the automated feeder switcher 320) to be decoupled from the electrical grid (as described further at least in relation to FIG. 12). By decoupling a non-critical feeder(s) from the electrical grid, essential feeders can be prioritized.

Figure 6:
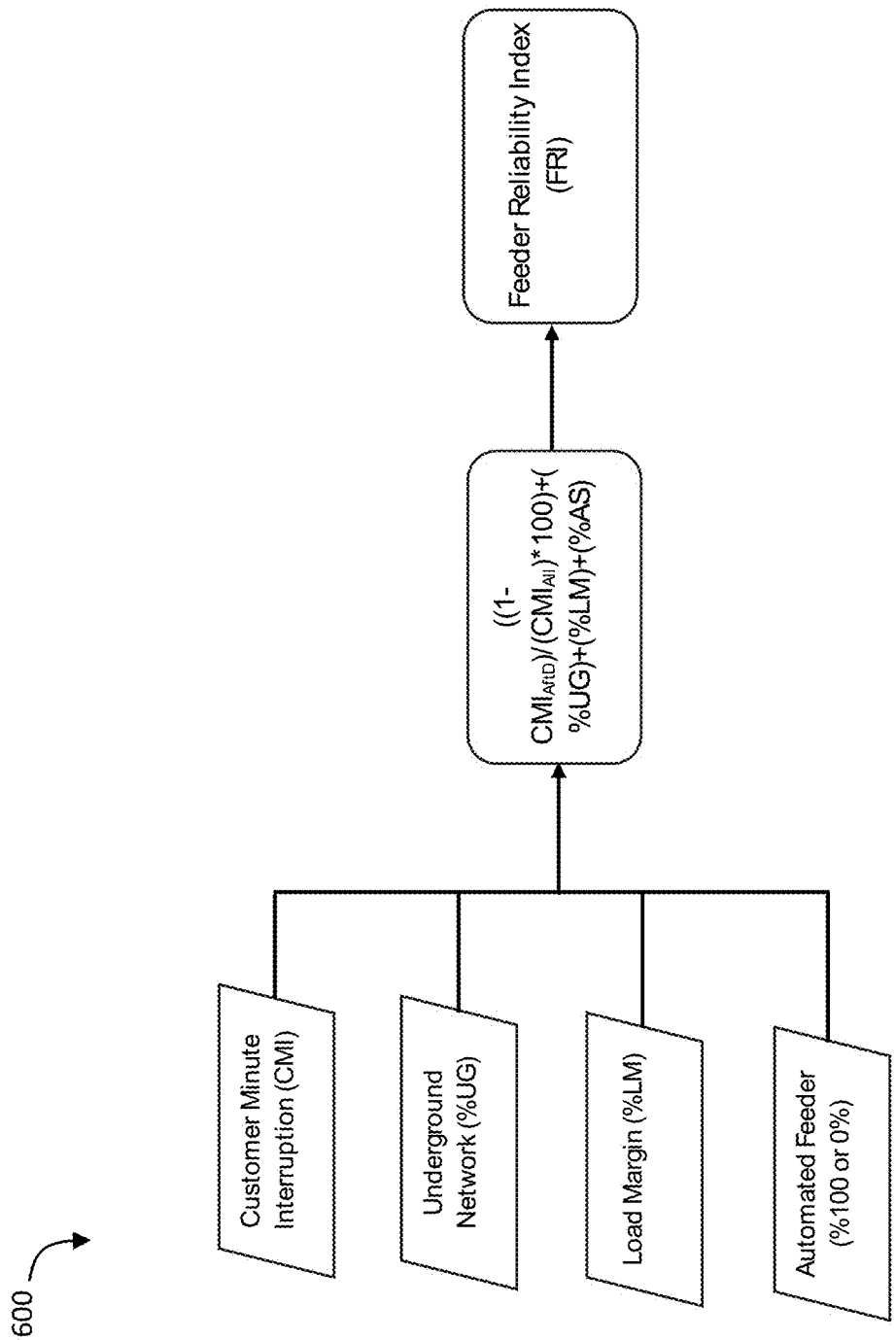
FIG. 6 shows a flow diagram illustrating a method implemented by a grid remediation system to determine a feeder reliability index (FRI) value, according to an embodiment.

The method 500 further includes determining a feeder reliability index (FRI) value for each feeder from a plurality of feeders, and a feeder from the plurality of feeders is selected based on the FRI value, as described further herein at least in relation to FIG. 6. An alternative feeder having a higher FRI value than a remaining alternative feeder(s) from a plurality of alternative feeders can selected, and the method can include switching over the impacted electrical grid portion to the alternative feeder having the higher FRI value. Alternatively or in addition, an alternative feeder can be selected based on that alternative feeder having an FRI value that is above a predetermined threshold. The method 500 also includes assigning a crew from a plurality of crews to an impacted electrical grid portion (e.g., if an alternative feeder is not selected for switchover), as described further herein at least in relation to FIG. 8.

The method 500 also includes assigning a crew to an impacted grid portion (and/or a location of the electrical grid that is impacting consumers) based on crew experience (e.g., skillset, training, etc., for a given fault type) and crew location relative to the portion of the electrical grid to be serviced. In some implementations, as shown in FIG. 5, the method 500 can include assessing (e.g., automatically and/or without human intervention) a hard loss (e.g., a damaged and/or affected component of the electrical grid) and/or a soft loss (e.g., a reduction in a load capability of the electrical grid and/or a reduction in a projected load capability of the electrical grid, in response to a disaster and/or the like). A grid remediation system can determine the hard loss and/or the soft loss in response to a crew having addressed (e.g., having made temporary repairs within) the impacted grid portion, such that grid remediation system can facilitate future network planning (e.g., contactor and/or switch configuration, as described herein at least in relation to FIG. 12). Crew selection is described further herein at least in relation to FIG. 8.

FIG. 6 shows a flow diagram illustrating a method 600 implemented by a grid remediation system to determine a feeder reliability index (FRI) value, according to an embodiment. The method 600 can be implemented by a grid remediation system described herein (e.g., the grid remediation system 100 of FIG. 1). For example, an FRI calculator that is functionally and/or structurally similar to the FRI calculator 316 of FIG. 3 can perform the method 600. Portions of the method 600 can be implemented using a processor (e.g., the processor 220 of FIG. 2) of any suitable compute device (e.g., the compute device 201 of FIG. 2 and/or the compute devices 110 and/or 120 of FIG. 1).

An FRI value for a given feeder can be determined based on the equation:

$$FRI = \frac{1 - SAIDI \text{ of given feeder}}{\text{Total } SAIDI \text{ of all available alternative feeders}} * 100 +$$

% of feeder network length that is underground +

% load margin availability + provision of automated switchover * 100

The "provision of an automated switchover" metric in the equation above can be a binary value (e.g., 0 or 1) based on whether the feeder does not include a provision for automated switching (e.g., via a remotely controlled switch) or does include a provision for automated switching.

Figure 7:
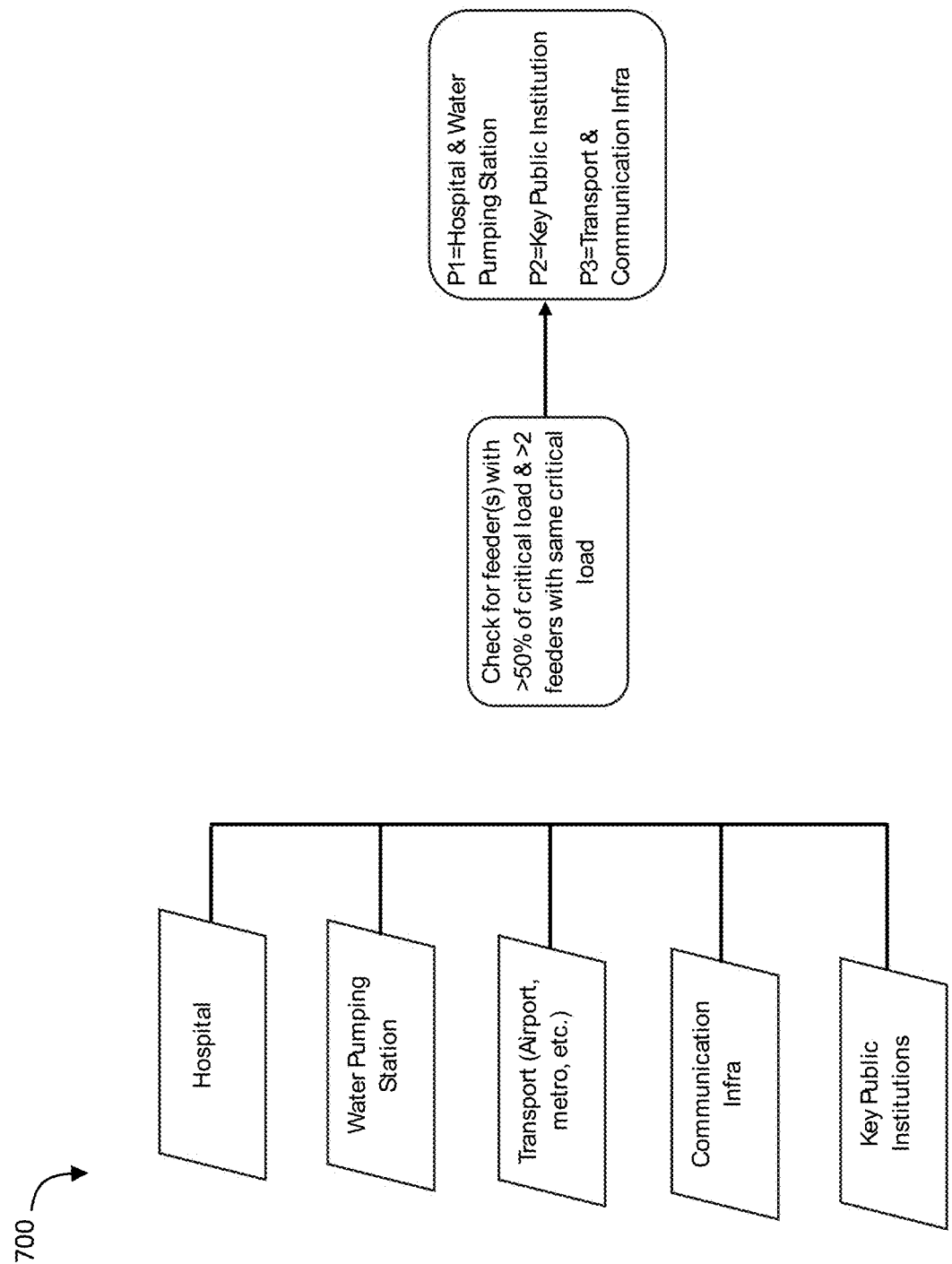
FIG. 7 shows a flow diagram illustrating a method implemented by a grid remediation system to prioritize electrical power consumers based on operational criticality values, according to an embodiment.

FIG. 7 shows a flow diagram illustrating a method 700 implemented by a grid remediation system to prioritize electrical power consumers based on operational criticality values, according to an embodiment. The method 700 can be implemented by a grid remediation system described herein (e.g., the grid remediation system 100 of FIG. 1). Portions of the method 700 can be implemented using a processor (e.g., the processor 220 of FIG. 2) of any suitable compute device (e.g., the compute device 201 of FIG. 2 and/or the compute devices 110 and/or 120 of FIG. 1).

An operational criticality value (also referred to herein as a critical feeder value (CF)) can be determined based on a day on which a peak load for a given a calendar year has been recorded.

For example, an electrical grid can have a peak load of 1000 MW on a particular day (referred to as a peak day) of a given calendar year, and the operational criticality value can be determined for each feeder (e.g., that feeds a consumer, such as a critical consumer) that day based on the following equation:

CF=((peak load of hospital feeder on grid's peak day+peak load of water pump station feeder on grid's peak day+peak load of transportation feeder on grid's peak day+peak load of government building feeder on grid's peak day+peak load of communication infrastructure feeder on grid's peak day)/Total load on a feeder on grid's peak day))

If CF>50% for a given feeder, that feeder can be considered a critical feeder. If two or more feeders have the same CF, the two or more feeders can be prioritized based on predefined priority categories. For example, feeders associated with priority category P1 can be prioritized for switchover before feeders that are associated with priority categories P2 & P3, and feeders associated with priority category P2 can be prioritized for switchover before feeders that are associated with priority category P3. A P1 prioritized category can be associated with, for example, a feeder having a hospital load and/or water pump station load; a P2 prioritized category can be associated with, for example, a feeder having a government building load; and a P3 prioritized category can be associated with, for example, a feeder having a transportation load and/or a communication infrastructure load. If two or more feeders from a given prioritized category have the same CF, the two or more feeder's absolute load can determine feeder prioritization, such that a feeder from the two or more feeders having the highest absolute load of the two or more feeders is prioritized before remaining feeders from the two or more feeders.

Figure 8:
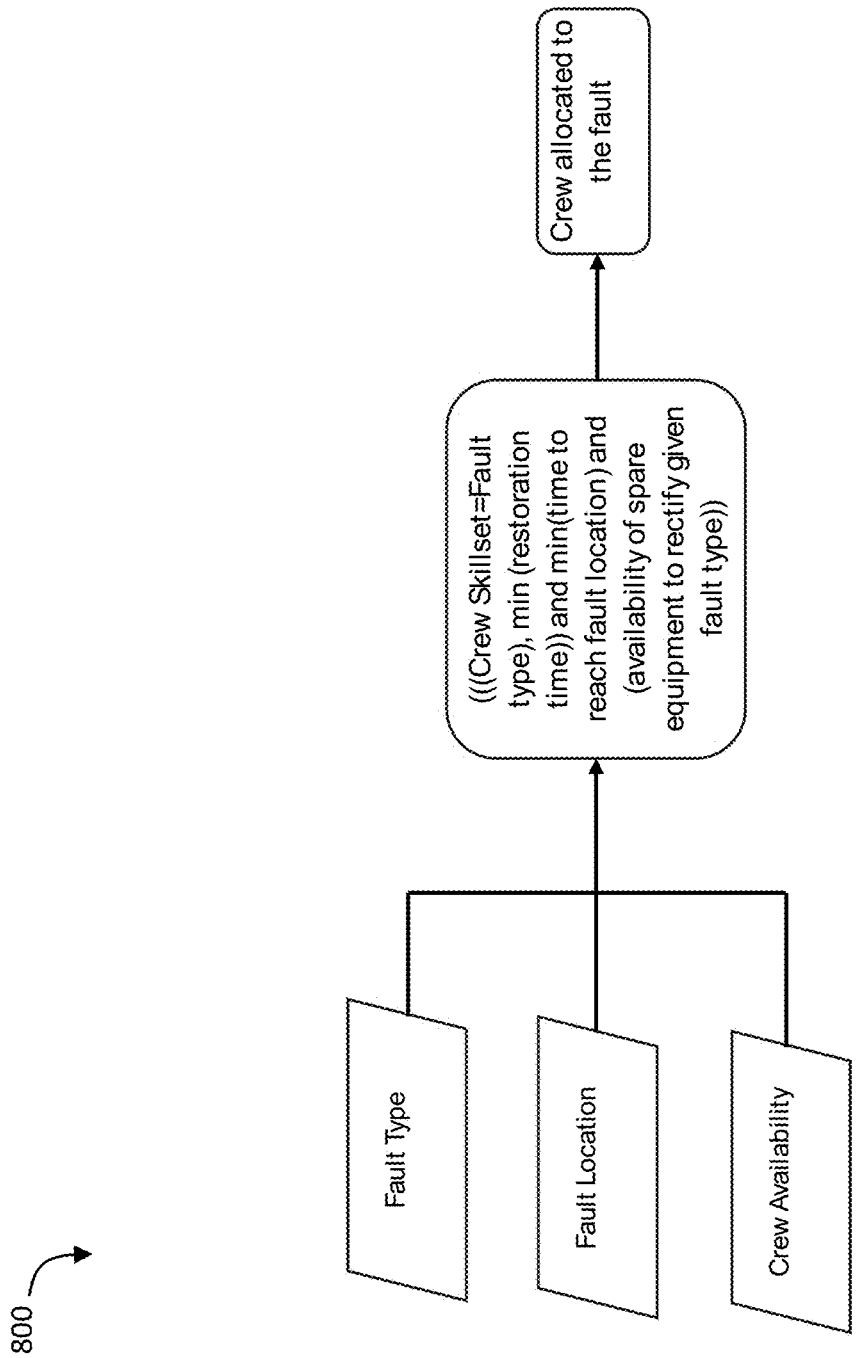
FIG. 8 shows a flow diagram illustrating a method implemented by a grid remediation system to identify a crew in response to identifying an impacted grid portion, according to an embodiment.

FIG. 8 shows a flow diagram illustrating a method 800 implemented by a grid remediation system to identify a crew in response to identifying an impacted grid portion, according to an embodiment. The method 800 can be implemented by a grid remediation system described herein (e.g., the grid remediation system 100 of FIG. 1). For example, a crew allocator that is functionally and/or structurally similar to the crew allocator 310 of FIG. 3 can perform the method 800. Portions of the method 800 can be implemented using a processor (e.g., the processor 220 of FIG. 2) of any suitable compute device (e.g., the compute device 201 of FIG. 2 and/or the compute devices 110 and/or 120 of FIG. 1).

The method 800 can include identifying a crew from a plurality of crews based on a fault type from a predefined set of fault types that includes, for example, a meter fault type, a streetlight fault type, a protection fault type, a cable fault type, and/or a transformer fault type. The crew can be identified based further on a distance of the crew from the impacted electrical grid portion (fault location) being less than the distance of remaining crews from the impacted electrical grid portion. This distance can be represented as a geographic distance (e.g., "as the crow flies"), a travel route distance (e.g., "as the wolf runs"), and/or a travel time. The crew can also be identified based further on an experience metric associated with the crew (e.g., the number of times the crew has work on a fault having the fault type, the average time the crew spends fixing a fault having the fault type, etc.).

Moreover, a crew can be identified based on crew availability (e.g., a number of future jobs assigned to the crew, a number of past jobs assigned to the crew within a predefined time period, etc.). For example, the method 800 can exclude a crew from being selected if the crew is currently assigned a higher number of jobs than a predetermined threshold and/or if the crew has been overburdened with a higher number of jobs in preceding week, month, etc. A crew can be identified and dispatched (e.g., in response to a generated alert signal) based on a sum of (1) the crew's travel time to the fault and (2) the crew's average fix time for the fault type, where that sum is less than the sums for remaining crews from the plurality of crews. In addition to this sum, a crew can also be identified based on whether the crew has equipment (e.g., personal protective equipment, lifts, tools, etc.), sufficient training to use that equipment, etc. For example, if a crew does not have sufficient equipment and/or training for a given fault type, the method 800 can preclude the crew from being selected even if the sum for that crew is lower than for remaining crews.

In response to a crew being identified, the method can include causing a signal to be sent to a compute device that is configured to alert (e.g., via a display and/or a graphical user interface) the crew of an impacted electrical grid portion, indicate to the crew the fault type and/or equipment to be used to address a fault, indicate to the crew a location of the electrical grid that the crew is to travel to address the fault, and/or the like.

Figure 9:
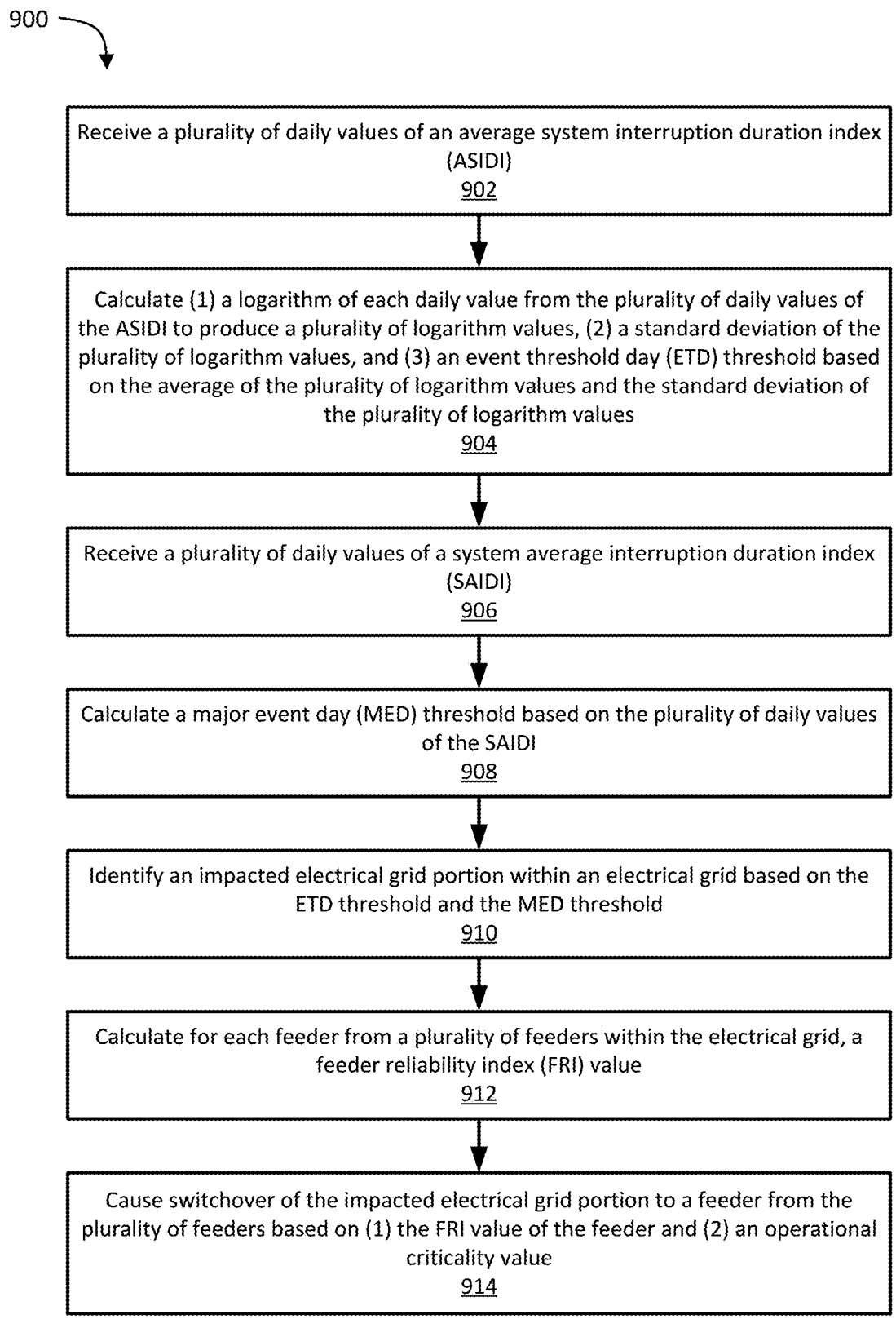
FIG. 9 shows a flow diagram illustrating a method implemented by a grid remediation system to identify an impacted electrical grid portion within an electrical grid based on an ETD threshold and a MED threshold, according to an embodiment.

FIG. 9 shows a flow diagram illustrating a method 900 implemented by a grid remediation system to identify an impacted electrical grid portion within an electrical grid based on an ETD threshold and a MED threshold, according to an embodiment. The method 900 can be implemented by a grid remediation system described herein (e.g., the grid remediation system 100 of FIG. 1). Portions of the method 900 can be implemented using a processor (e.g., the processor 220 of FIG. 2) of any suitable compute device (e.g., the compute device 201 of FIG. 2 and/or the compute devices 110 and/or 120 of FIG. 1).

The method 900 at 902 includes receiving a plurality of daily values of an average system interruption duration index (ASIDI). The method 900 at 904 includes calculating (1) a logarithm of each daily value from the plurality of daily values of the ASIDI to produce a plurality of logarithm values, (2) a standard deviation of the plurality of logarithm values, and (3) an event threshold day (ETD) threshold based on an average of the plurality of logarithm values and the standard deviation of the plurality of logarithm values. A plurality of daily values of a system average interruption duration index (SAIDI) are received at 906, and a major event day (MED) threshold is calculated at 908 based on the plurality of daily values of the SAIDI. The method 900 at 910 includes identifying an impacted electrical grid portion within an electrical grid based on the ETD threshold and the MED threshold. For each feeder from a plurality of feeders within the electrical grid, a feeder reliability index (FRI) value is calculated at 912 based on the plurality of daily values of the SAIDI for that feeder and the plurality of daily values of the SAIDI for each remaining feeder from the plurality of feeders. The method 900 at 914 includes causing switchover of the impacted electrical grid portion to a feeder from the plurality of feeders based on (1) the FRI value of the feeder being no lower than the FRI value of each remaining feeder from the plurality of feeders and (2) an operational criticality value associated with a system that is fed by the feeder, the operational criticality value being no lower than an operational criticality value of each remaining feeder from the plurality of feeders.

Figure 10:
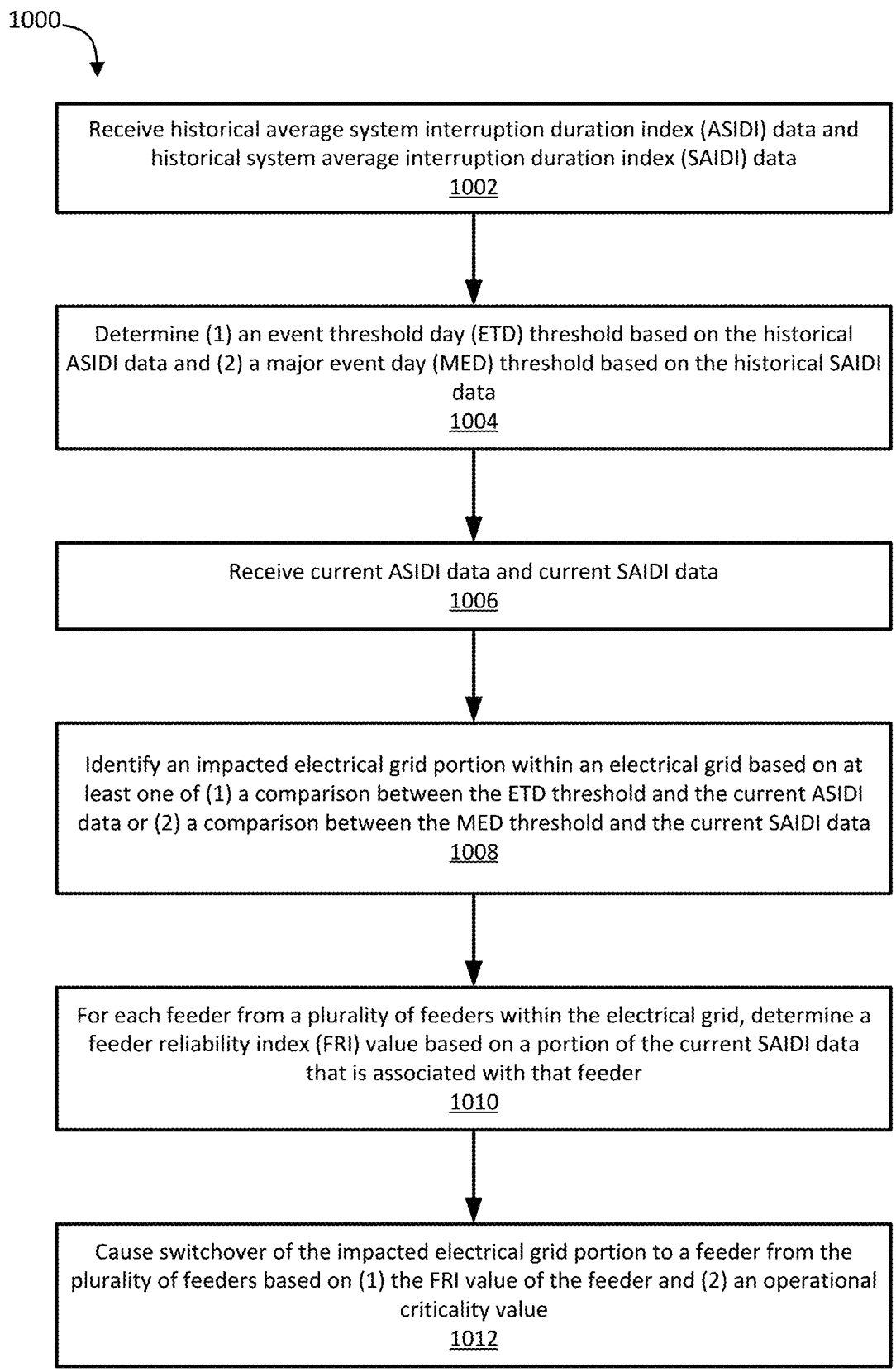
FIG. 10 shows a flow diagram illustrating a method implemented by a grid remediation system to determine a feeder reliability index (FRI) value based on a portion of current SAIDI data that is associated with a feeder, according to an embodiment.

FIG. 10 shows a flow diagram illustrating a method 1000 implemented by a grid remediation system to determine a feeder reliability index (FRI) value based on a portion of current SAIDI data that is associated with a feeder, according to an embodiment. The method 1000 can be implemented by a grid remediation system described herein (e.g., the grid remediation system 100 of FIG. 1). Portions of the method 1000 can be implemented using a processor (e.g., the processor 220 of FIG. 2) of any suitable compute device (e.g., the compute device 201 of FIG. 2 and/or the compute devices 110 and/or 120 of FIG. 1).

The method 1000 includes receiving, at 1002, historical average system interruption duration index (ASIDI) data and historical system average interruption duration index (SAIDI) data. The method 1000 at 1004 includes determining (1) an event threshold day (ETD) threshold based on the historical ASIDI data and (2) a major event day (MED) threshold based on the historical SAIDI data. Current ASIDI data and current SAIDI data are received at 1006, and an impacted electrical grid portion within an electrical grid is identified at 1008 based on at least one of (1) a comparison between the ETD threshold and the current ASIDI data or (2) a comparison between the MED threshold and the current SAIDI data. For each feeder from a plurality of feeders within the electrical grid, a feeder reliability index (FRI) value is determined at 1010 based on a portion of the current SAIDI data that is associated with that feeder. The method 1000 at 1012 includes causing switchover of the impacted electrical grid portion to a feeder from the plurality of feeders based on (1) the FRI value of the feeder being no lower than the FRI value of each remaining feeder from the plurality of feeders and (2) an operational criticality value of the feeder being no lower than an operational criticality value of each remaining feeder from the plurality of feeders.

FIG. 11 shows a flow diagram illustrating a method 1100 implemented by a grid remediation system to cause switchover of an impacted electrical grid portion to a feeder from a plurality of feeders based on a criticality value, according to an embodiment. The method 1100 can be implemented by a grid remediation system described herein (e.g., the grid remediation system 100 of FIG. 1). Portions of the method 1100 can be implemented using a processor (e.g., the processor 220 of FIG. 2) of any suitable compute device (e.g., the compute device 201 of FIG. 2 and/or the compute devices 110 and/or 120 of FIG. 1).

The method 1100 at 1102 includes receiving historical average system interruption duration index (ASIDI) data. At 1104, the method 1100 includes calculating (1) an average of a plurality of natural logarithm values based on a portion of the ASIDI data that is associated with a plurality of interruption days, (2) a standard deviation of the plurality of natural logarithm values, and (3) an event threshold day (ETD) threshold based on the average of the plurality of natural logarithm values and the standard deviation of the plurality of natural logarithm values. An impacted electrical grid portion within an electrical grid is identified at 1106 based on the ETD threshold and current ASIDI data. Switchover of the impacted electrical grid portion to a feeder from a plurality of feeders is caused at 1108 based on a criticality value associated with a system that is fed by the feeder, the criticality value being no lower than a criticality value of each remaining feeder from the plurality of feeders.

FIG. 12 shows a schematic diagram of an electrical grid 1200, according to an embodiment. Dashed lines within FIG. 12 can represent electrical power transmission, and solid arrows can represent communication signals. The electrical grid 1200 includes a consumer(s) 1201 and a consumer(s) 1224, which can each include, for example, a city network (e.g., a plurality of residential houses), a rural network (e.g., a plurality of rural homes, a farm, etc.), a commercial and/or industrial facility, and/or the like. As described further below, in some instances, the consumer(s) 1201 can include a critical consumer(s), and the consumer(s) 1224 can include a non-critical consumer and/or can exclude a consumer that is as critical or more critical than the consumer(s) 1201, as determined by respective operational criticality scores for the consumer(s) 1201 and the consumer(s) 1224.

The electrical grid 1200 also includes switches 1202 and 1204 (which can be, for example, multi-pole switches, a plurality of contactors, etc.), feeder lines 1206, 1208, 1210, and 1212 (e.g., transmission lines), substations 1214 and 1216 (which include, respectively, step down transformers 1215 and 1217), power sources 1218 and 1220, contactors 1222 and 1230 (which can be, for example, single pole switches), a voltage sensor 1226, and a battery 1228. The switches 1202 and 1204, the contactors 1222 and 1230, and the voltage sensor 1226 are operably (e.g., communicatively) coupled to a compute device(s) via a network N3. This compute device(s) (not shown in FIG. 12) can be functionally and/or structurally similar to the compute devices 110 and/or 120 of FIG. 1 and/or the compute device 201 of FIG. 2. For example, the compute device(s) can be configured to execute (1) a grid monitor that is functionally and/or structurally similar to the grid monitor 102 of FIG. 1 and/or (2) a grid remediation application that is functionally and/or structurally similar to the grid remediation application 122 of FIG. 1, the grid remediation application 212 of FIG. 2, and/or the grid remediation application 312 of FIG. 3. The network N3 can be functionally and/or structurally similar to the network N1 of FIG. 1 and/or the network N2 of FIG. 2.

In some implementations, a grid remediation application (e.g., that is executed via a compute device that is remote to the electrical grid 1200 and is operably coupled to the network N3) can cause switchover of an impacted portion of the electrical grid 1200 by causing a signal to be sent via the network N3 to a switch(s) 1202 and/or 1204. For example, the electrical grid 1200 can be initially configured, based on a position of the switch 1202, to deliver electrical power from the power source 1218 (e.g., a generating station) to the consumer(s) 1201 via the substation 1214 and the feeder line 1206. As described herein, the grid remediation application can identify that at least one of the power source 1218, the substation 1214 (e.g., the step down transformer 1215 and/or another component(s) of the substation 1214), and/or the feeder line 1206 is impacted or potentially impacted. In response, and based on FRI values that are determined (e.g., by an FRI calculator that is included in the grid remediation application and that is functionally and/or structurally similar to the FRI calculator 316 of FIG. 3) for the feeder lines 1208, 1210, and 1212, the grid remediation application can cause switchover of the consumer(s) 1201 from the feeder line 1206 to the feeder line 1208, the feeder line 1210, and/or the feeder line 1212.

The grid remediation application can cause switchover by, for example, causing a signal(s) to be sent via the network N3 to the switch 1202 and/or the switch 1204. In response to receiving the signal(s), the switch 1202 and/or the switch 1204 can be configured to actuate to cause a feeder line 1206, 1208, 1210, and/or 1212 to be coupled to and/or decoupled from the electrical grid 1200. For example, in response to determining that the consumer(s) 1201 are impacted (or potentially impacted) by a failed, strained, or potentially strained substation 1214, the grid remediation application can cause a signal to be generated that, when received at the switch 1202 via the network N3, actuates the switch 1202 to cause the switch 1202 to electrically decouple from the feeder line 1206 and electrically couple to the feeder line 1208. As a result, the electrical grid 1200 can deliver electrical power from the power source 1218 to the consumer(s) 1201 via the substation 1216, which can be associated with a higher FRI value than the substation 1214.

To further illustrate, in response to determining that the consumer(s) 1201 are impacted (or potentially impacted) by a failed, strained, or potentially strained power source 1218, the grid remediation application can cause a signal to be generated that, when received at the switch 1204 via the network N3, actuates the switch 1204 to cause the switch 1204 to electrically decouple from the feeder line 1210 and electrically couple to the feeder line 1212. As a result, the electrical grid 1200 can deliver from the power source 1220 (e.g., and not from the power source 1218 or, alternatively, in addition to delivering power from the power source 1218) to the consumer(s) 1201.

The grid remediation application can also include a grid frequency monitor (e.g., that is functionally and/or structurally similar to the grid frequency monitor 322 of FIG. 3), not shown in FIG. 12, and the voltage sensor 1226 can measure voltage within the electrical grid 1200 and cause these measurements to be received by the grid remediation application via the network N3. Based on the voltage measurements, the grid frequency monitor can detect a grid frequency (e.g., a frequency of alternating current within the electrical grid 1200) that is above a maximum threshold frequency value or below a minimum threshold frequency value. In response to determining that the grid frequency is above the maximum threshold frequency value, the grid frequency monitor can cause a signal to be sent that, when received at the contactor 1230 via the network N3, actuates the contactor 1230 to cause the battery 1228 to electrically couple to the electrical grid 1200. By being coupled to the battery 1228, the electrical grid 1200 can charge the battery 1228 and, as a result, the battery 128 can increases load on the electrical grid. This increased load can cause the grid frequency to reduce to below the maximum threshold frequency value. Alternatively, in response to determining that the grid frequency is below the minimum threshold frequency value, the grid frequency monitor can cause a signal to be sent that, when received at the contactor 1222, actuates the contactor to cause the consumer(s) 1224 to decouple from the electrical grid 1200. The consumer(s) 1224 decoupling from the electrical grid 1200 can cause load on the electrical grid 1200 to reduce, which can cause the grid frequency to increase above the minimum threshold frequency value. The grid remediation application can receive operational criticality values (e.g., that are similar to the operational criticality values 318 of FIG. 3) that specify that the consumer(s) 1224 are non-critical consumers and that the consumer(s) 1201 are critical consumers. As a result, the grid frequency monitor can control the contactor 1230 to decouple the consumer(s) 1224, and not the consumer(s) 1201, from the electrical grid 1200 to adjust the grid frequency to at least a minimum desired frequency.

According to an embodiment, a method includes receiving a plurality of daily values of an average system interruption duration index (ASIDI). The method also includes calculating (1) a logarithm of each daily value from the plurality of daily values of the ASIDI to produce a plurality of logarithm values, (2) an average of the plurality of logarithm values, (3) a standard deviation of the plurality of logarithm values, and (4) an event threshold day (ETD) threshold based on the average of the plurality of logarithm values and the standard deviation of the plurality of logarithm values. A plurality of daily values of a system average interruption duration index (SAIDI) are received, and a major event day (MED) threshold is calculated based on the plurality of daily values of the SAIDI. The method also includes identifying an impacted electrical grid portion within an electrical grid based on the ETD threshold and the MED threshold. For each feeder from a plurality of feeders within the electrical grid, a feeder reliability index (FRI) value is calculated based on the plurality of daily values of the SAIDI for that feeder and the plurality of daily values of the SAIDI for each remaining feeder from the plurality of feeders. The method also includes causing switchover of the impacted electrical grid portion to a feeder from the plurality of feeders based on (1) the FRI value of the feeder being no lower than the FRI value of each remaining feeder from the plurality of feeders and (2) an operational criticality value associated with a system that is fed by the feeder, the operational criticality value being no lower than an operational criticality value of each remaining feeder from the plurality of feeders.

In some implementations, the method can further include (1) causing display of a representation of the impacted electrical grid portion in response to the identifying and (2) causing display of a representation of the feeder in response to the causing switchover. In some implementations, the calculating the FRI value can be further based on an underground length value associated with that feeder. In some implementations, the calculating the FRI value can be further based on a load margin availability value associated with that feeder, the load margin availability value being calculated based on a comparison between (1) a capacity associated with that feeder and (2) a sum of a first load associated with that feeder and a second load associated with the impacted electrical grid portion. In some implementations, the operational criticality value of the feeder is equivalent to the operational criticality value of at least one remaining feeder from the plurality of feeders. Additionally, the causing switchover of the impacted electrical grid portion to the feeder can be further based on a load value of the feeder being greater than a load value of the at least one remaining feeder.

In some implementations, the method can further include receiving a measured grid frequency value associated with the electrical grid and comparing the measured grid frequency value to a predetermined grid frequency value. Additionally, in response to the measured grid frequency value being less than the predetermined grid frequency value, the method can include causing at least one feeder from the plurality of feeders to be operably decoupled from the electrical grid. In response to the measured grid frequency value being greater than the predetermined grid frequency value, the method can also include causing an energy storage system to be operably coupled to the electrical grid.

In some implementations, the method can further include determining a crew from a plurality of crews based on (1) a fault type associated with the impacted electrical grid portion, (2) a first geographic location associated with the impacted electrical grid portion, (3) a second geographic location associated with the crew, and (4) an experience metric associated with the crew. In response to determining the crew, the method can also include causing the crew to be dispatched to the first geographic location. In some implementations, the method can further include receiving an indication of a human factor, the identifying the impacted electrical grid portion being based further on the indication of the human factor. In some implementations, the method can further include receiving weather data, the identifying the impacted electrical grid portion being based further on the weather data.

According to an embodiment, a non-transitory, machine-readable medium stores instructions that, when executed by a processor, cause the processor to receive historical average system interruption duration index (ASIDI) data and historical system average interruption duration index (SAIDI) data. The instructions also cause the processor to determine (1) an event threshold day (ETD) threshold based on the historical ASIDI data and (2) a major event day (MED) threshold based on the historical SAIDI data. Current ASIDI data and current SAIDI data are received, and an impacted electrical grid portion within an electrical grid is identified based on at least one of (1) a comparison between the ETD threshold and the current ASIDI data or (2) a comparison between the MED threshold and the current SAIDI data. For each feeder from a plurality of feeders within the electrical grid, a feeder reliability index (FRI) value is determined based on a portion of the current SAIDI data that is associated with that feeder. The instructions also cause the processor to cause switchover of the impacted electrical grid portion to a feeder from the plurality of feeders based on (1) the FRI value of the feeder being no lower than the FRI value of each remaining feeder from the plurality of feeders and (2) an operational criticality value of the feeder being no lower than an operational criticality value of each remaining feeder from the plurality of feeders.

In some implementations, the non-transitory, machine-readable medium can further store instructions to cause the processor to receive a measured grid frequency value associated with the electrical grid, after switchover of the impacted electrical grid portion to the feeder. The instructions can also cause the processor to compare the measured grid frequency value to a predetermined grid frequency value. In response to the measured grid frequency value being less than the predetermined grid frequency value, the instructions can cause the processor to cause at least one feeder from the plurality of feeders to be operably decoupled from the electrical grid. Additionally, in response to the measured grid frequency value being greater than the predetermined grid frequency value, the instructions can cause the processor to cause an energy storage system to be operably coupled to the electrical grid.

In some implementations, the non-transitory, machine-readable medium can further store instructions to cause the processor to (1) cause display of a representation of the electrical grid and (2) cause display of a visual indication of the impacted electrical grid portion superimposed over the representation of the electrical grid. In some implementations, the non-transitory, machine-readable medium can further store instructions to cause the processor to determine a crew from a plurality of crews based on (1) a fault type associated with the impacted electrical grid portion, (2) a first geographic location associated with the impacted electrical grid portion, (3) a second geographic location associated with the crew, and (4) an experience metric associated with the crew. The instructions can also cause the processor to cause a signal to be generated, the signal configured to alert the crew of the impacted electrical grid portion. In some implementations, the operational criticality value of the feeder can be equivalent to the operational criticality value of at least one remaining feeder from the plurality of feeders. Additionally, the instructions to cause switchover of the impacted electrical grid portion to the feeder can include instructions to cause switchover of the impacted electrical grid portion to the feeder based on a load value of the feeder being greater than a load value of the at least one remaining feeder.

According to an embodiment, a non-transitory, machine-readable medium stores instructions that, when executed by a processor, cause the processor to receive historical average system interruption duration index (ASIDI) data and calculate (1) an average of a plurality of natural logarithm values based on a portion of the ASIDI data that is associated with a plurality of interruption days, (2) a standard deviation of the plurality of natural logarithm values, and (3) an event threshold day (ETD) threshold based on the average of the plurality of natural logarithm values and the standard deviation of the plurality of natural logarithm values. An impacted electrical grid portion within an electrical grid is identified based on the ETD threshold and current ASIDI data. Switchover of the impacted electrical grid portion to a feeder from a plurality of feeders is caused based on a criticality value associated with a system that is fed by the feeder, the criticality value being no lower than a criticality value of each remaining feeder from the plurality of feeders.

In some implementations, the non-transitory, machine-readable medium can further store instructions to cause the processor to receive, after switchover of the impacted electrical grid portion to the feeder, a signal that encodes a grid frequency value associated with the electrical grid. The instructions can also cause the processor to compare the grid frequency value to a predetermined grid frequency value. In response to the grid frequency value being less than the predetermined grid frequency value, the instructions can cause at least one feeder from the plurality of feeders to be operably decoupled from the electrical grid. In response to the grid frequency value being greater than the predetermined grid frequency value, the instructions can cause an energy storage system to be operably coupled to the electrical grid.

In some implementations, the non-transitory, machine-readable medium can further store instructions to cause the processor to receive current system average interruption duration index (SAIDI) data. The instructions can also cause the processor to calculate, for each feeder from the plurality of feeders, a feeder reliability index (FRI) value based on the current SAIDI data, the FRI value of the feeder being no lower than the FRI value of each remaining feeder from the plurality of feeders.

In some implementations, the non-transitory, machine-readable medium can further store instructions to cause the processor to select a crew from a plurality of crews based on at least one of (1) a fault type associated with the impacted electrical grid portion, (2) a first geographic location associated with the impacted electrical grid portion, (3) a second geographic location associated with the crew, or (4) an experience metric associated with the crew. The instructions can also cause the processor to cause a signal to be generated, the signal configured to alert the crew of the impacted electrical grid portion.

In some implementations, the operational criticality value of the feeder can be equivalent to the operational criticality value of at least one remaining feeder from the plurality of feeders. Additionally, the instructions to cause switchover of the impacted electrical grid portion to the feeder can include instructions to cause switchover of the impacted electrical grid portion to the feeder based on a load value of the feeder being greater than a load value of the at least one remaining feeder. In some implementations, the instructions to identify the impacted electrical grid portion within the electrical grid can include instructions to identify the impacted electrical grid portion based on a human factor.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
   receiving a plurality of daily values of an average system interruption duration index (ASIDI);
   calculating a logarithm of each daily value from the plurality of daily values of the ASIDI to produce a plurality of logarithm values;
   calculating an average of the plurality of logarithm values;
   calculating a standard deviation of the plurality of logarithm values;
   calculating an event threshold day (ETD) threshold based on the average of the plurality of logarithm values and the standard deviation of the plurality of logarithm values;
   receiving a plurality of daily values of a system average interruption duration index (SAIDI);
   calculating a major event day (MED) threshold based on the plurality of daily values of the SAIDI;
   identifying an impacted electrical grid portion within an electrical grid based on the ETD threshold and the MED threshold;
   calculating, for each feeder from a plurality of feeders within the electrical grid, a feeder reliability index (FRI) value based on the plurality of daily values of the SAIDI for that feeder and the plurality of daily values of the SAIDI for each remaining feeder from the plurality of feeders; and
   causing switchover of the impacted electrical grid portion to a feeder from the plurality of feeders based on (1) the FRI value of the feeder being no lower than the FRI value of each remaining feeder from the plurality of feeders and (2) an operational criticality value associated with a system that is fed by the feeder, the operational criticality value being no lower than an operational criticality value of each remaining feeder from the plurality of feeders.

2. The method of claim 1, further comprising:
   causing display of a representation of the impacted electrical grid portion in response to the identifying; and
   causing display of a representation of the feeder in response to the causing switchover.

3. The method of claim 1, wherein the calculating the FRI value is further based on an underground length value associated with that feeder.

4. The method of claim 1, wherein the calculating the FRI value is further based on a load margin availability value associated with that feeder, the load margin availability value being calculated based on a comparison between (1) a capacity associated with that feeder and (2) a sum of a first load associated with that feeder and a second load associated with the impacted electrical grid portion.

5. The method of claim 1, wherein:
   the operational criticality value of the feeder is equivalent to the operational criticality value of at least one remaining feeder from the plurality of feeders; and
   the causing switchover of the impacted electrical grid portion to the feeder is further based on a load value of the feeder being greater than a load value of the at least one remaining feeder.

6. The method of claim 1, further comprising:
   receiving a measured grid frequency value associated with the electrical grid;
   comparing the measured grid frequency value to a predetermined grid frequency value;
   in response to the measured grid frequency value being less than the predetermined grid frequency value, causing at least one feeder from the plurality of feeders to be operably decoupled from the electrical grid; and
   in response to the measured grid frequency value being greater than the predetermined grid frequency value, causing an energy storage system to be operably coupled to the electrical grid.

7. The method of claim 1, further comprising:
   determining a crew from a plurality of crews based on (1) a fault type associated with the impacted electrical grid portion, (2) a first geographic location associated with the impacted electrical grid portion, (3) a second geographic location associated with the crew, and (4) an experience metric associated with the crew; and
   in response to determining the crew, causing the crew to be dispatched to the first geographic location.

8. The method of claim 1, further comprising receiving an indication of a human factor, the identifying the impacted electrical grid portion being based further on the indication of the human factor.

9. The method of claim 1, further comprising receiving weather data, the identifying the impacted electrical grid portion being based further on the weather data.

10. A non-transitory, machine-readable medium storing instructions that, when executed by a processor, cause the processor to:
    receive historical average system interruption duration index (ASIDI) data and historical system average interruption duration index (SAIDI) data;

determine (1) an event threshold day (ETD) threshold based on the historical ASIDI data and (2) a major event day (MED) threshold based on the historical SAIDI data;

receive current ASIDI data and current SAIDI data;

identify an impacted electrical grid portion within an electrical grid based on at least one of (1) a comparison between the ETD threshold and the current ASIDI data or (2) a comparison between the MED threshold and the current SAIDI data;

determine, for each feeder from a plurality of feeders within the electrical grid, a feeder reliability index (FRI) value based on a portion of the current SAIDI data that is associated with that feeder; and cause switchover of the impacted electrical grid portion to a feeder from the plurality of feeders based on (1) the FRI value of the feeder being no lower than the FRI value of each remaining feeder from the plurality of feeders and (2) an operational criticality value of the feeder being no lower than an operational criticality value of each remaining feeder from the plurality of feeders.

11. The non-transitory, machine-readable medium of claim 10, further storing instructions to cause the processor to:

receive a measured grid frequency value associated with the electrical grid, after switchover of the impacted electrical grid portion to the feeder;

compare the measured grid frequency value to a predetermined grid frequency value;

in response to the measured grid frequency value being less than the predetermined grid frequency value, cause at least one feeder from the plurality of feeders to be operably decoupled from the electrical grid; and in response to the measured grid frequency value being greater than the predetermined grid frequency value, cause an energy storage system to be operably coupled to the electrical grid.

12. The non-transitory, machine-readable medium of claim 10, further storing instructions to cause the processor to:

cause display of a representation of the electrical grid; and cause display of a visual indication of the impacted electrical grid portion superimposed over the representation of the electrical grid.

13. The non-transitory, machine-readable medium of claim 10, further storing instructions to cause the processor to:

determine a crew from a plurality of crews based on (1) a fault type associated with the impacted electrical grid portion, (2) a first geographic location associated with the impacted electrical grid portion, (3) a second geographic location associated with the crew, and (4) an experience metric associated with the crew; and cause a signal to be generated, the signal configured to alert the crew of the impacted electrical grid portion.

14. The non-transitory, machine-readable medium of claim 10, wherein:

the operational criticality value of the feeder is equivalent to the operational criticality value of at least one remaining feeder from the plurality of feeders; and the instructions to cause switchover of the impacted electrical grid portion to the feeder include instructions to cause switchover of the impacted electrical grid portion to the feeder based on a load value of the feeder being greater than a load value of the at least one remaining feeder.

15. A non-transitory, machine-readable medium storing instructions that, when executed by a processor, cause the processor to:

receive historical average system interruption duration index (ASIDI) data;

calculate an average of a plurality of natural logarithm values based on a portion of the ASIDI data that is associated with a plurality of interruption days;

calculate a standard deviation of the plurality of natural logarithm values;

calculate an event threshold day (ETD) threshold based on the average of the plurality of natural logarithm values and the standard deviation of the plurality of natural logarithm values;

identify an impacted electrical grid portion within an electrical grid based on the ETD threshold and current ASIDI data; and cause switchover of the impacted electrical grid portion to a feeder from a plurality of feeders based on an operational criticality value associated with a system that is fed by the feeder, the operational criticality value being no lower than an operational criticality value of each remaining feeder from the plurality of feeders.

16. The non-transitory, machine-readable medium of claim 15, further storing instructions to cause the processor to:

receive, after switchover of the impacted electrical grid portion to the feeder, a signal that encodes a grid frequency value associated with the electrical grid;

compare the grid frequency value to a predetermined grid frequency value;

in response to the grid frequency value being less than the predetermined grid frequency value, cause at least one feeder from the plurality of feeders to be operably decoupled from the electrical grid; and in response to the grid frequency value being greater than the predetermined grid frequency value, cause an energy storage system to be operably coupled to the electrical grid.

17. The non-transitory, machine-readable medium of claim 15, further storing instructions to cause the processor to:

receive current system average interruption duration index (SAIDI) data; and calculate, for each feeder from the plurality of feeders, a feeder reliability index (FRI) value based on the current SAIDI data, the FRI value of the feeder being no lower than the FRI value of each remaining feeder from the plurality of feeders.

18. The non-transitory, machine-readable medium of claim 15, further storing instructions to cause the processor to:

select a crew from a plurality of crews based on at least one of (1) a fault type associated with the impacted electrical grid portion, (2) a first geographic location associated with the impacted electrical grid portion, (3) a second geographic location associated with the crew, or (4) an experience metric associated with the crew; and cause a signal to be generated, the signal configured to alert the crew of the impacted electrical grid portion.

19. The non-transitory, machine-readable medium of claim 15, wherein:

the operational criticality value of the feeder is equivalent to the operational criticality value of at least one remaining feeder from the plurality of feeders; and the instructions to cause switchover of the impacted electrical grid portion to the feeder include instructions to cause switchover of the impacted electrical grid portion to the feeder based on a load value of the feeder being greater than a load value of the at least one remaining feeder.

20. The non-transitory, machine-readable medium of claim 15, wherein the instructions to identify the impacted electrical grid portion within the electrical grid include instructions to identify the impacted electrical grid portion based on a human factor.

* * * * *